(12) United States Patent
Graesser et al.

(10) Patent No.: US 9,057,610 B2
(45) Date of Patent: Jun. 16, 2015

(54) ROBOTIC LASER POINTER APPARATUS AND METHODS

(71) Applicant: Trimble A.B., Danderyd (SE)

(72) Inventors: Christian Graesser, Vallentuna (SE);
Robert Miller, Commerce City, CO (US); Mikael Nordenfelt, Bergshamra (SE)

(73) Assignee: Trimble A.B., Danderyd (SE)

( * ) Notice: Subject to any disclaimer, the term of this patent is extended or adjusted under 35 U.S.C. 154(b) by 182 days.

(21) Appl. No.: 13/791,907

(22) Filed: Mar. 9, 2013

(65) Prior Publication Data

US 2014/0123508 A1    May 8, 2014

Related U.S. Application Data

(60) Provisional application No. 61/722,168, filed on Nov. 3, 2012.

(51) Int. Cl.
*G01C 15/00* (2006.01)

(52) U.S. Cl.
CPC .............. *G01C 15/00* (2013.01); *G01C 15/002* (2013.01)

(58) Field of Classification Search
CPC ............................... G01C 15/00; G01C 15/002
USPC ............................................................ 33/290
See application file for complete search history.

(56) References Cited

U.S. PATENT DOCUMENTS

| | | | | | |
|---|---|---|---|---|---|
| 5,629,756 | A  | * | 5/1997 | Kitajima | ...................... 356/3.09 |
| 5,877,892 | A  | * | 3/1999 | Nakamura et al. | ............. 359/426 |
| 6,182,372 | B1 | * | 2/2001 | Lamm | ............................. 33/290 |
| 6,237,235 | B1 | * | 5/2001 | Feist et al. | ...................... 33/295 |
| 6,734,410 | B2 | * | 5/2004 | Kaneko et al. | ............. 250/201.2 |
| 7,441,340 | B2 |   | 10/2008 | Hertzman | |
| 7,503,123 | B2 | * | 3/2009 | Matsuo et al. | ................... 33/290 |
| 7,667,823 | B2 | * | 2/2010 | Nakaniwa | ..................... 356/4.01 |
| 8,031,332 | B2 | * | 10/2011 | Miller et al. | .................. 356/4.01 |
| 8,087,176 | B1 | * | 1/2012 | Hayes et al. | ..................... 33/280 |
| 8,269,984 | B2 | * | 9/2012 | Hinderling et al. | ........... 356/614 |
| 2006/0016085 | A1 | * | 1/2006 | Imamura et al. | ................ 33/290 |

(Continued)

OTHER PUBLICATIONS

"DL2: Diode laser with intensity regulator," Leica AG Photogrammetry and Metrology, 6 pp., Nov. 1994.

(Continued)

*Primary Examiner* — Christopher Fulton

(74) *Attorney, Agent, or Firm* — Kilpatrick Townsend & Stockton LLP

(57) ABSTRACT

A robotic laser-pointing apparatus has an instrument center, a first rotation axis, a second rotation axis, and a pointing axis, with the first rotation axis, the second rotation axis and the pointing axis in a known relationship to the instrument center. A laser source provides a pointing-laser beam along the pointing axis. A pointing drive system aims the laser beam by rotating the pointing axis about the instrument center in response to a pointing-direction control. Focusing optics having a focusing-optics drive serve to focus the pointing-laser beam in response to a focusing-optics control. A processor, responsive to target-position information, generates the pointing-direction control and the focusing-optics control. Some embodiments include an electronic-distance-measurement system having a measurement beam. Some embodiments provide for compensation of aiming errors of the pointing-laser beam and the measurement beam.

44 Claims, 22 Drawing Sheets

(56) References Cited

U.S. PATENT DOCUMENTS

2010/0088910 A1* 4/2010 Svanholm et al. ............. 33/290
2012/0105870 A1 5/2012 Miller et al.
2014/0190025 A1* 7/2014 Giger et al. .................... 33/228

OTHER PUBLICATIONS

"Leica 3D Disto User Manual Version 1.2 English," Leica Geosystems AG, 197 pp., 2011.
"Leica Geosystems Metrology Products Catalog Version 1.1," Hexagon Metrology, 76 pp., Jun. 2011.
"Pentax R-300X series: Stretching the limits . . . ," Pentax Industrial Instruments Co., Ltd., 6 pp., undated brochure.
"Pentax Electronic Total Station R-300 Series Instruction Manual," Pentax Precision Co., Ltd., 91 pp., Oct. 30, 2002.
SwissTek products listing from www.swisstek.com/kern_swiss.htm, 5 pp., Oct. 28, 2012.
R. Höglund et al., "Direct Reflex EDM Technology for the Surveyor and Civil Engineer," Trimble Navigation Limited, 10 pp., 2005.
"Trimble Field Link for MEP—Taking Construction Layout to the Next Level," Trimble Navigation Limited, 1 p., Oct. 31, 2012.
"Trimble Mechanical, Electrical and Plumbing (MEP): Accuracy and Productivity for Tight Construction Schedules," 1 p., Trimble Navigation Limited, Oct. 31, 2012.
"Trimble GX 3D Scanner Datasheet," Trimble Navigation Limited, 2 pp., Sep. 2009.
"Trimble Introduces New Hardware and Software Version for its Trimble Field Link Construction Layout Solutions," Trimble Navigation Limited, 2 pp., Nov. 5, 2012.

* cited by examiner

| Size | Brightness |
|---|---|
| 5 | 1 |

| Size | Brightness |
|---|---|
| 1 | 25 |

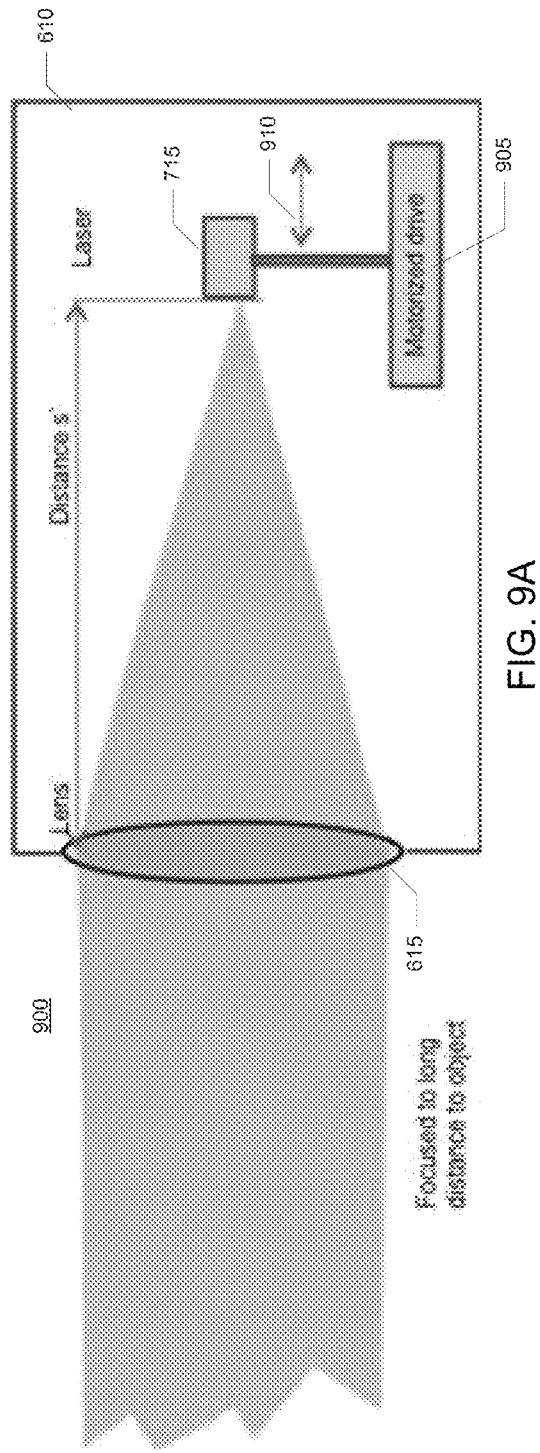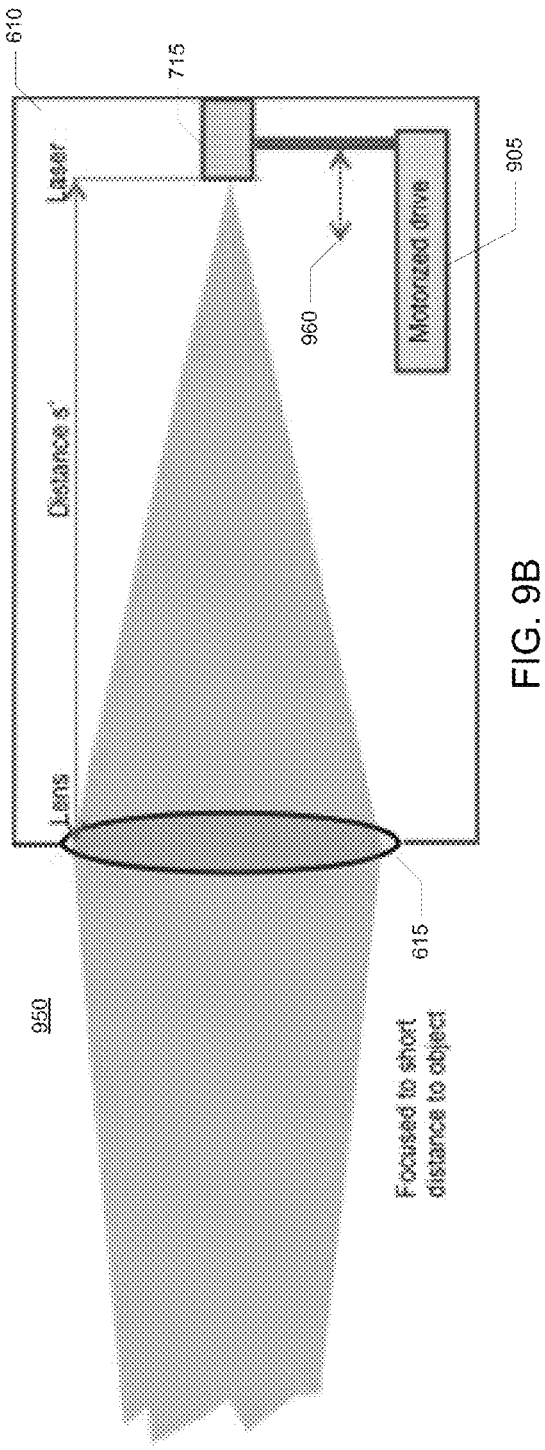

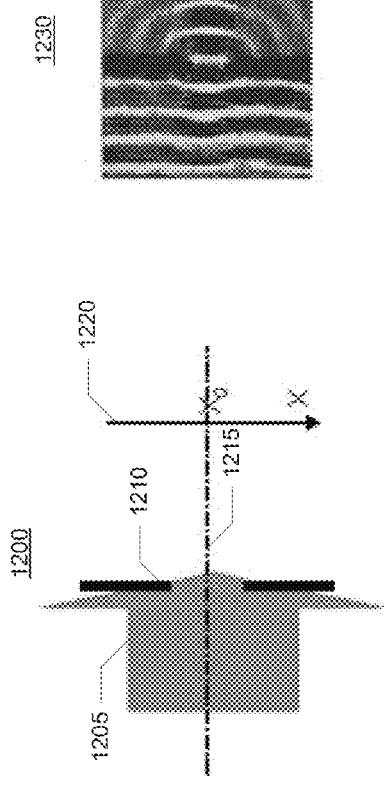
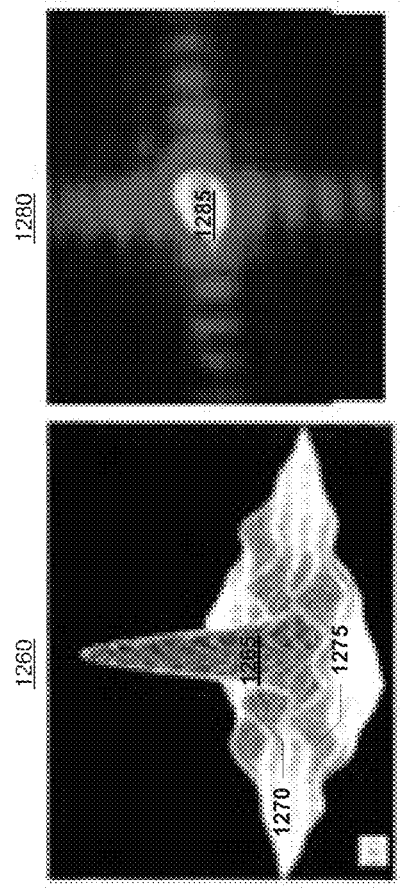
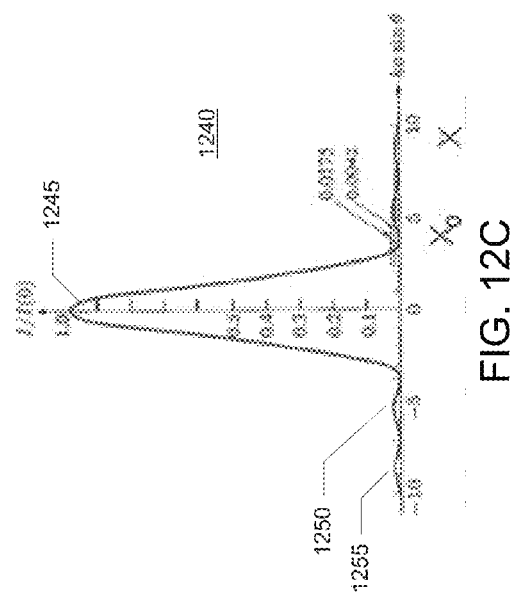
FIG. 12B
FIG. 12E
FIG. 12A
FIG. 12D
FIG. 12C

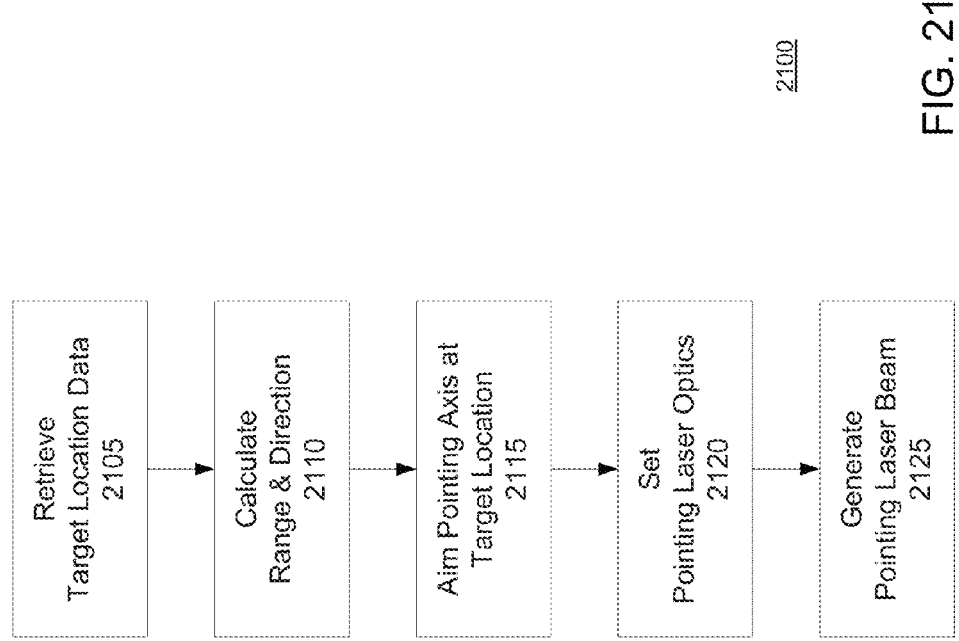

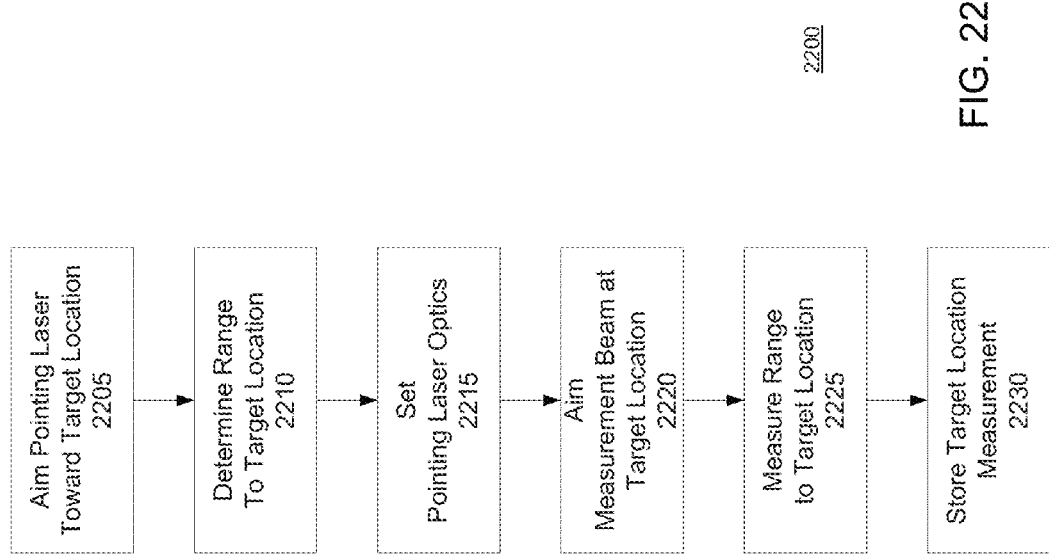

ROBOTIC LASER POINTER APPARATUS AND METHODS

RELATED APPLICATIONS

The following patents and publications are related hereto and their content is incorporated herein by this reference: Provisional application for U.S. Patent No. 61/722,168 filed 3 Nov. 2012; U.S. Pat. No. 7,441,340 B2 dated 28 Oct. 2008; U.S. Pat. No. 8,031,332 B2 dated 4 Oct. 2011; and United States Patent Application Publication No. 2012/0105870 A1 dated 3 May 2012.

BACKGROUND

Laying out mechanical, electrical and plumbing systems in new buildings under construction, or in existing buildings undergoing renovations or additions, is tedious, time consuming, and expensive. Typically, it has required a significant amount of labor to lay out construction points at a construction site on walls, ceilings and other surfaces, so that holes can be drilled and cuts made to permit the passage of pipes, conduits and the like, and to permit the installation of hangers, switches, fittings and other items. This layout process has required teams of workers that measure and mark the locations of these construction points, with much of the work being accomplished manually.

Manually measuring and accounting for all of these variables to locate construction points on walls and other vertical surfaces is difficult and time consuming. This process is subject to measurement errors and to accumulated errors which compound as successive measurements are made going from one intermediate point to the next. Further, building designs and requirements have become more complex, and construction schedules have become tighter, adding to the need to facilitate and simplify the layout process.

Robotic total stations are sometimes used for this purpose. For example, U.S. Pat. No. 8,031,332 B2 describes an iterative process using construction data with a robotic total station to direct a beam of laser light and establish a construction point.

A total station positioned at a known location directs a beam of laser light toward a target (e.g., an object or object point or construction point). By measuring the time of flight of the beam, the distance between the total station and the target is determined. By also measuring the direction of the beam from the total station to the target, i.e., the altitude and azimuth angles that define a vector from the total station to the target, the location of the target can be precisely determined.

Robotic or automated total stations are capable of locating an object point without being attended by an operator. Such total stations can be controlled to point in precisely determined directions. A total station can point to surfaces throughout a worksite and, by detecting the light reflected from those surfaces, determine the three-dimensional coordinates of the illuminated points throughout the worksite in relation to the position of the total station. If the coordinates and the orientation of the total station are known, the coordinates of the illuminated points are also known.

Robotic total stations are known to make distance and angle measurements, compute the location of the robotic total station relative to reference points, and then use the robotic total station's red distance-measurement laser as a pointer for layout of construction points. Trimble Navigation Limited provides such laser-pointer layout functionality in its field software products "Trimble MEP" and "Trimble Field Link for MEP" which are offered with its robotic total station models RTS555, RTS655, RTS633, RTS773 and other instruments. While these represent a significant advance over prior products, further improvements are desirable.

Using the red distance-measurement laser of a robotic total station as a pointer, e.g., for construction layout, has a number of drawbacks. First, the wavelength of the red laser makes it difficult for the human eye to see a spot projected on a target under daylight conditions. FIG. 1 shows the luminosity (human color perception) of light as a function of wavelength. For example, the luminosity of a typical red laser of 650 nm wavelength is about 0.1 in daylight and is effectively zero at night.

Second, the electronic-distance-measurement (EDM) optics are not well suited for use as a pointer. Visible-laser EDM optics have small aperture for the transmitted beam to separate the transmission path from the reception path and avoid coupling transmitted and received light. The EDM of a typical total station has coaxial paths for the transmitted beam and capture of light reflected from a target surface. The transmitted beam passes through a small center aperture, while the light reflected from the target returns through a much larger aperture having its central region blocked by the center aperture of the transmitted-beam path.

FIG. 2 schematically illustrates at 200 the optics of such a total station. A first optical path, which allows a user to view a target, is defied by an eyepiece 205 with reticle 210 and prism 215, a focusing lens 220 and a front lens 225. Focusing lens 220 is adjusted by a motorized focusing drive 230. The EDM laser beam 240 enters from the side and is deflected by a transmitter prism 245 to exit as a small-diameter beam through front lens 225 along optical path 250. Light 255 received along optical path 250 enters over the full aperture of front lens 225 and is shadowed at the center by the small-diameter transmitter prism 245. Received light is reflected by mirror 265 along a path 270 to an EDM detector (not shown). Mirror 275 reflects light along a path 280 to a target-tracking detector.

The transmitted laser beam travels in a straight direction, but has a divergence: its diameter increases with distance. The divergence is a function of the diameter of the laser beam at the lens that focuses or collimates the laser. That effect is called diffraction. The basic formula for the diffraction-related divergence angle is:

$$\sin\alpha = \frac{1.22 \cdot \lambda}{D}$$

where $\alpha$ is the half divergence angle of the beam to its first diffraction minimum and $\lambda$ is the wavelength and D is the diameter of the limiting optics. Thus, the divergence of a laser is larger if the diameter that the laser uses at the optics is smaller. Typical divergence angles $\alpha$ are 0.1 to 0.2 mrad. This results in spot diameters of 10 mm to 20 mm at 50 m distance.

If the pointing beam is at a small angle (e.g., 20 deg) to the wall or ceiling, the laser spot width increases in one direction by a factor of three in that case. At the same time the visibility decreases by a factor of three. Thus a laser spot that is wide has very poor visibility, reducing precision of the layout task. Many operators compensate by using shorter distances and a larger angle to the wall/ceiling. Limiting the use cases to shorter distances and large angles needs more set-ups of the instrument per working area.

The divergence angle due to the small center aperture and fixed optics of the transmitted EDM laser beam means that the diameter of a spot projected on a surface increases significantly with distance from the robotic total station.

FIG. 3 schematically illustrates at 300 a layout scenario using a total station 305 to layout a point on a ceiling 310 using the EDM laser beam 315 to produce an unfocused laser pointer spot. The angle beta between the ceiling 310 and the beam 315 is shown at 325. A beam of width d_b shown at 320 produces a spot of width d_w shown at 330 according to the relation $$d\_w = d\_b/\sin(\text{beta})$$

so that $d\_w \approx 3 \cdot d\_b$ for beta=20 deg and $d\_w \approx 6 \cdot d\_b$ for beta=9 deg.

FIG. 5A shows an example of a laser spot of size 5 having a brightness level 1. FIG. 5B shows an example of a laser spot of size 1 having a brightness level of 25. Laser power is limited by the laser class, e.g., a Class 2 laser has a 1 mW limit. A laser spot of 10 mm diameter has an area of 100 square mm, while a laser spot of 2 mm diameter has an area of 4 square mm. Thus the same laser produces a spot which is 25 times (100/4) brighter at 2 mm diameter than at 10 mm diameter, and is more visible even with lower laser power.

The user is thus tasked with identifying the projected red laser spot, whose color has low luminosity and whose diameter varies greatly with distance from the total station, and then tasked with visually estimating the center of the projected spot as the desired construction point.

A proposed solution to pointing with non-robotic theodolites is to remove the eyepiece of the theodolite telescope and replace it with a pointing laser. The pointing laser uses the optical path otherwise provided for the user to manually aim the telescope at a target. One example is the SwissTek Kern laser eyepiece having a green pointing laser whose dot size can be manually focused. A similar eyepiece-replacement solution, for industrial total stations, is the Leica DL2 Diode Laser Pointer having a red laser. A disadvantage of these manually-focused laser pointers is that the spot size at a given focus setting varies with distance from the instrument, so that to adjust the spot size requires manually resetting the laser focus for each measurement range during a layout project.

The Pentax R-300X series instruments have user-selectable lasers and prismless auto focus which focuses the EDM laser to get signal return at short range. A laser-pointer function turns the laser beam on continuously to become the aiming point for visual confirmation. The laser beam is designed not to be able to observe through the telescope. The user is instructed to visually align the laser beam to the target and mark the center. The user is instructed to confirm the horizontal and vertical alignment before measuring when performing accurate work like stake out when using the laser pointer function. The Pentax R-300X series instruments are not robotic, and thus not suitable for automated pointing. Thus, the user stands behind the instrument. In contrast, with a robotic instrument the user is at the target location to mark the construction point.

Another instrument, the Leica Disto 3D robotic pointer, lacks focusing of the laser pointer and thus has the issues of spot size and brightness discussed above.

Another instrument, the Trimble GX scanner, uses a focusable green laser for high-speed scanning of points, but is a different class of instrument unsuited to construction layout applications.

Improved apparatus and methods are desired.

SUMMARY

Some embodiments in accordance with the invention provide a robotic laser-pointing apparatus having an instrument center, a first rotation axis, a second rotation axis, and a pointing axis, with the first rotation axis, the second rotation axis and the pointing axis in a known relationship to the instrument center. A laser source provides a pointing-laser beam along the pointing axis. A pointing drive system aims the laser beam by rotating the pointing axis about the instrument center in response to a pointing-direction control. Focusing optics having a focusing-optics drive serve to focus the pointing-laser beam in response to a focusing-optics control. A processor, responsive to target-position information, generates the pointing-direction control and the focusing-optics control.

Some embodiments include an electronic-distance-measurement system having a measurement beam. Some embodiments provide for compensation of aiming errors of the pointing-laser beam and the measurement beam.

Some embodiments provide a camera and display. In some embodiments the display is a touch-screen which enables tap-and-move aiming. Some embodiments include a remote controller in communication with the processor via a data link for remote control of the apparatus. Some embodiments provide a touch-screen display in communication with the remote controller to enable viewing of a pointing-laser spot on a target surface and to enable tap-and-move aiming.

Some embodiments provide methods of operation of the apparatus for layout of construction points. Some embodiments provide methods of operation of the apparatus for measuring construction points.

BRIEF DESCRIPTION

These and other features of some embodiments of the claimed invention are illustrated in the drawing figures, in which:

FIG. 1 shows the luminosity (human color perception) of light as a function of wavelength;

FIG. 2 schematically illustrates the optics of a typical total station;

FIG. 3 schematically illustrates a prior art layout scenario using an unfocused laser pointer;

FIG. 4 schematically illustrates a layout scenario using a focused laser pointer in accordance with some embodiments of the invention;

FIG. 5A shows a large laser beam spot;

FIG. 5B shows a small laser beam spot;

Figure 6:
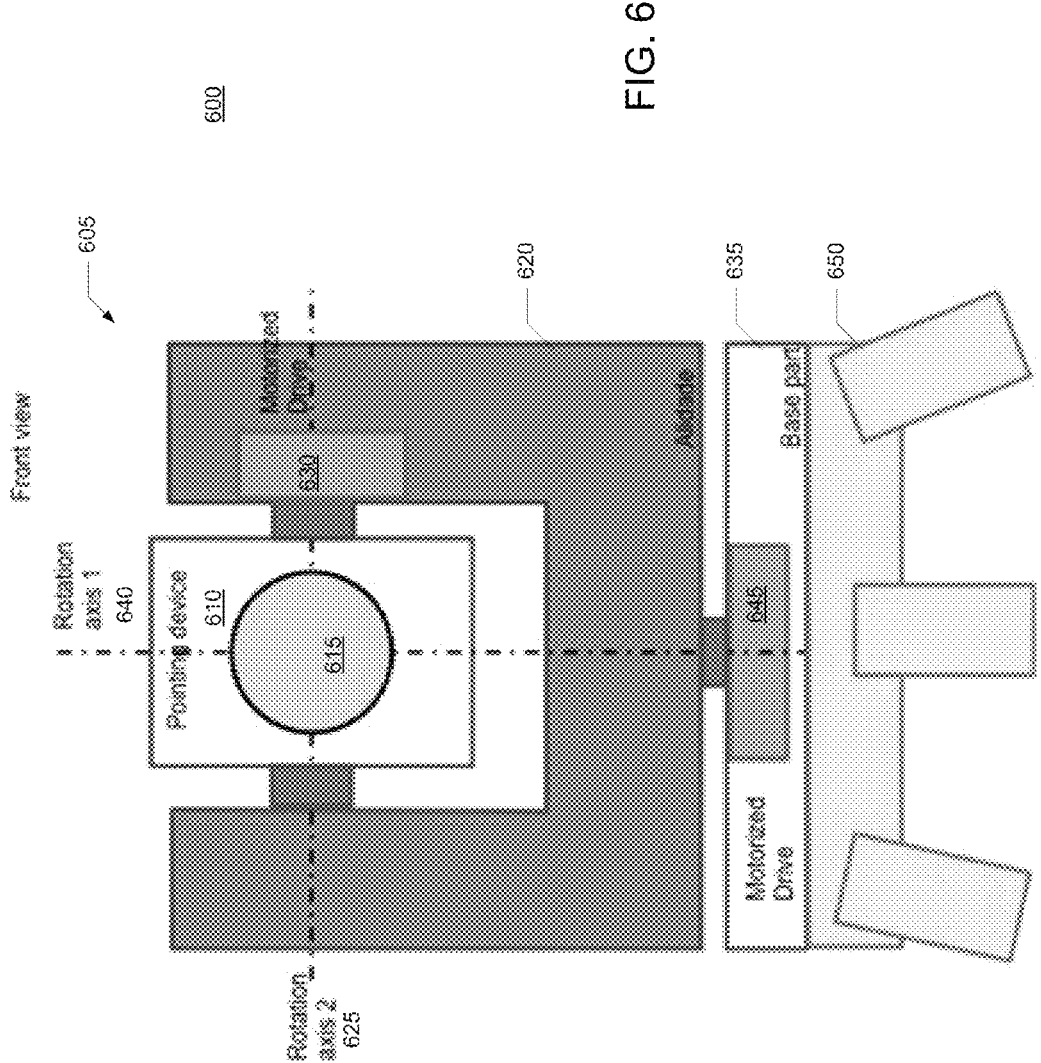
Figure 7:
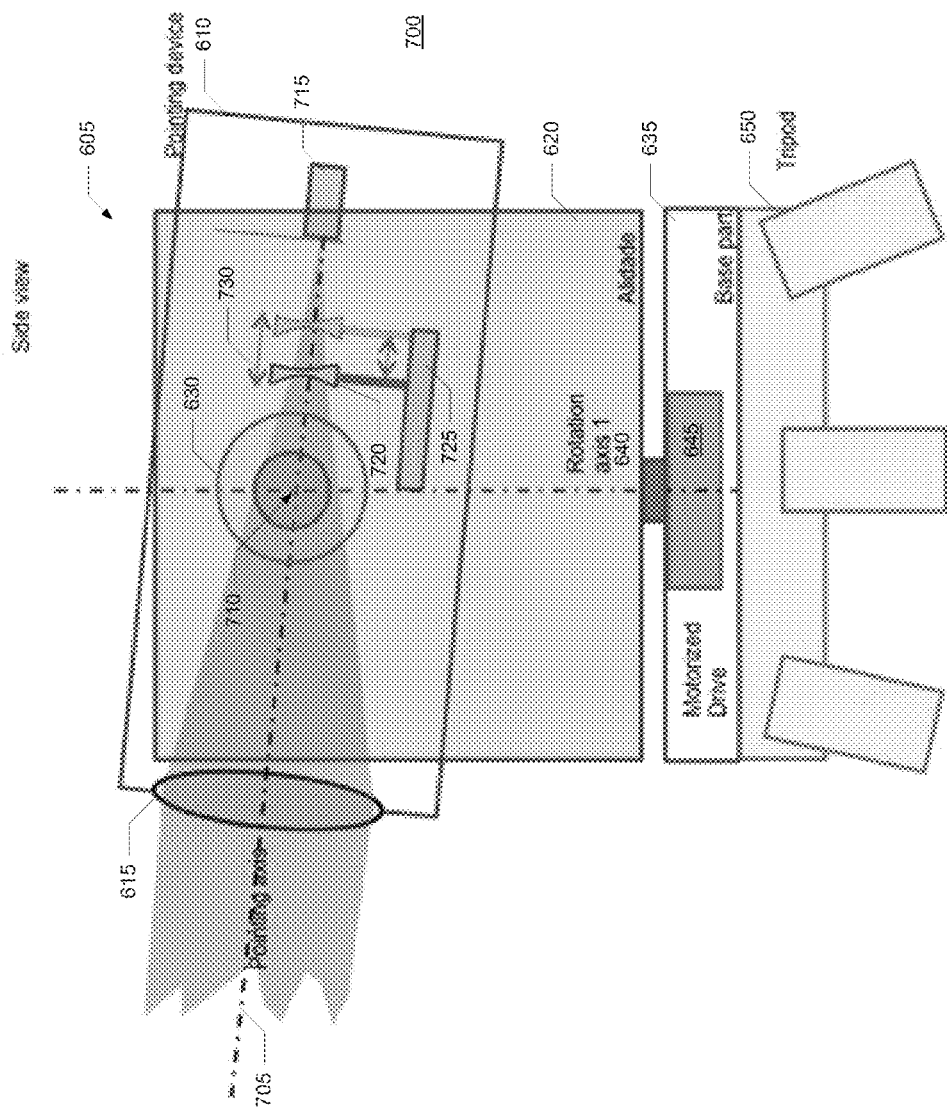
Figure 8:
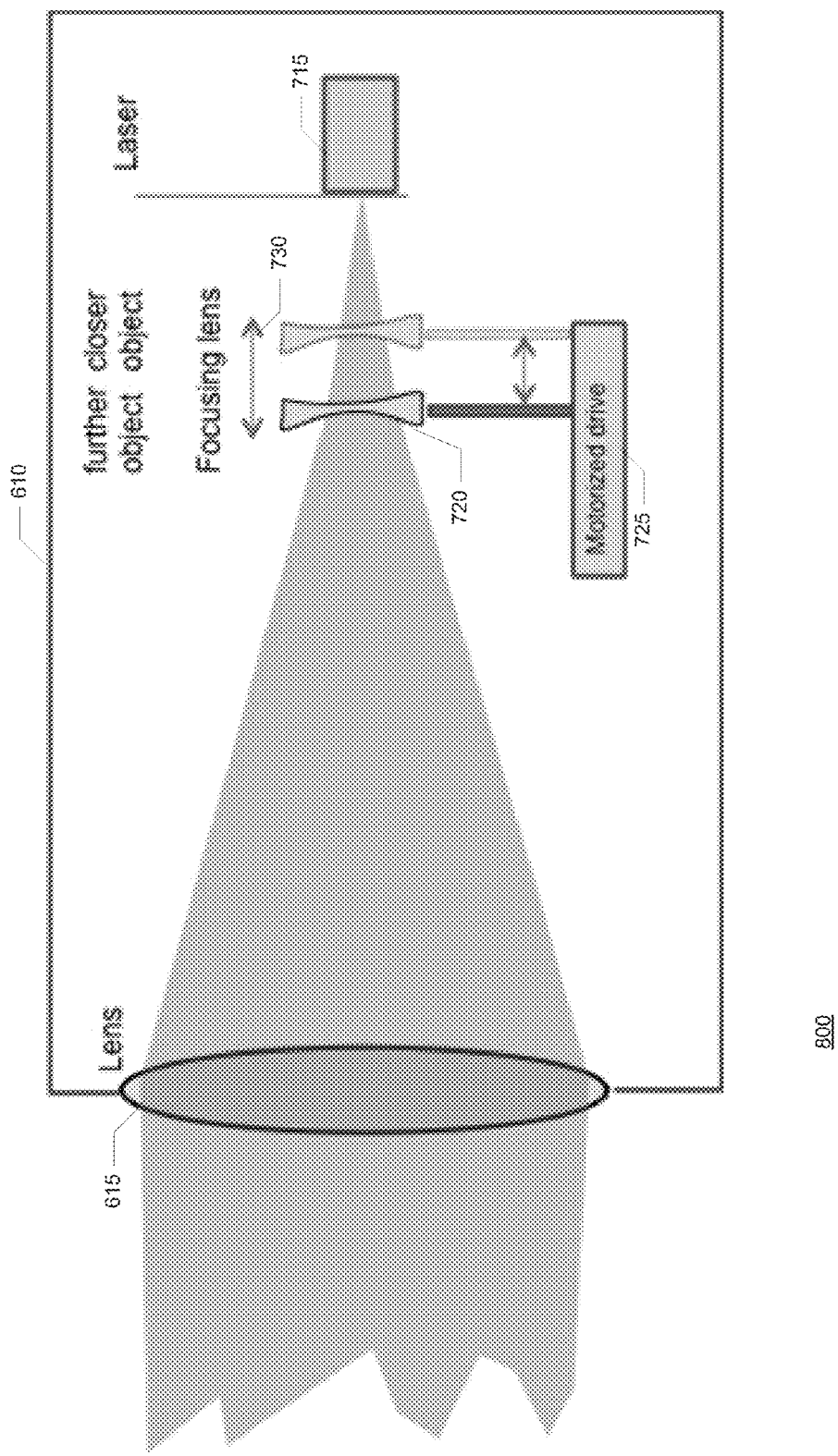
Figure 10:
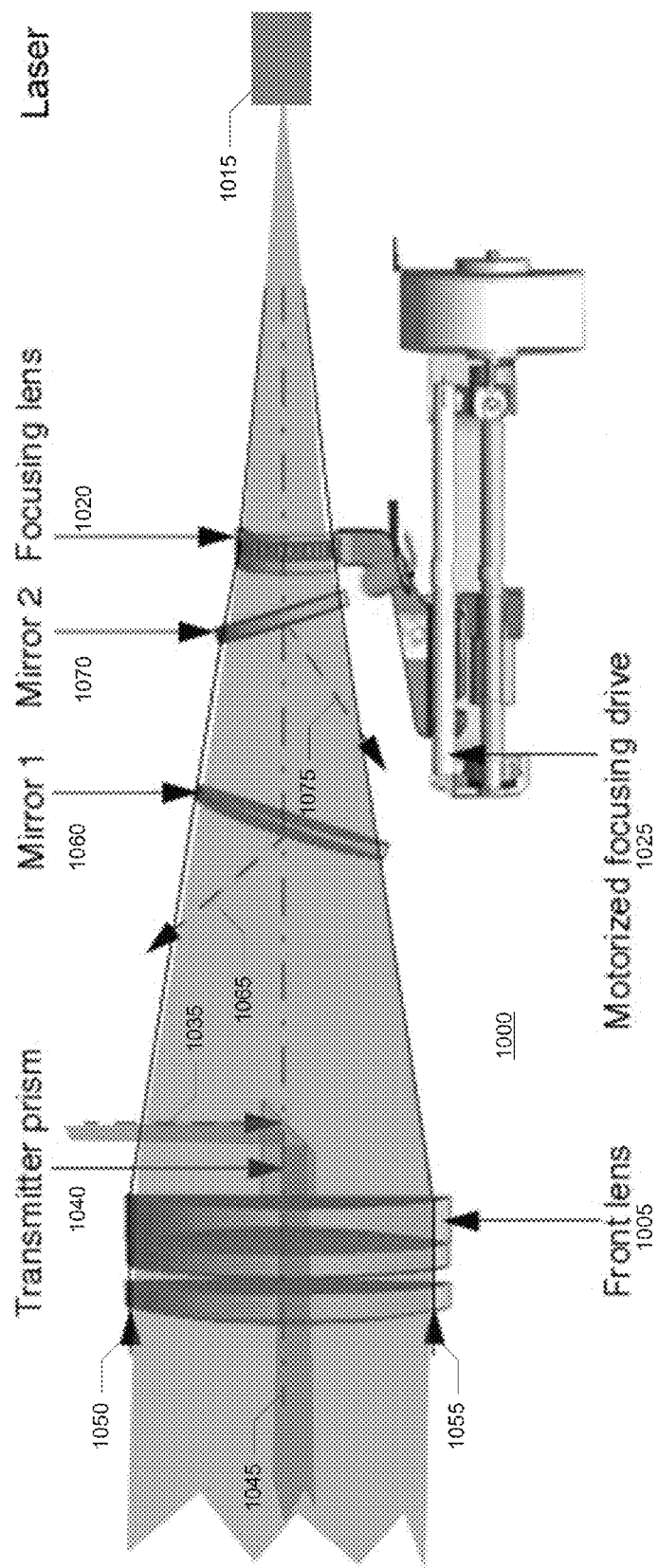
Figure 11:
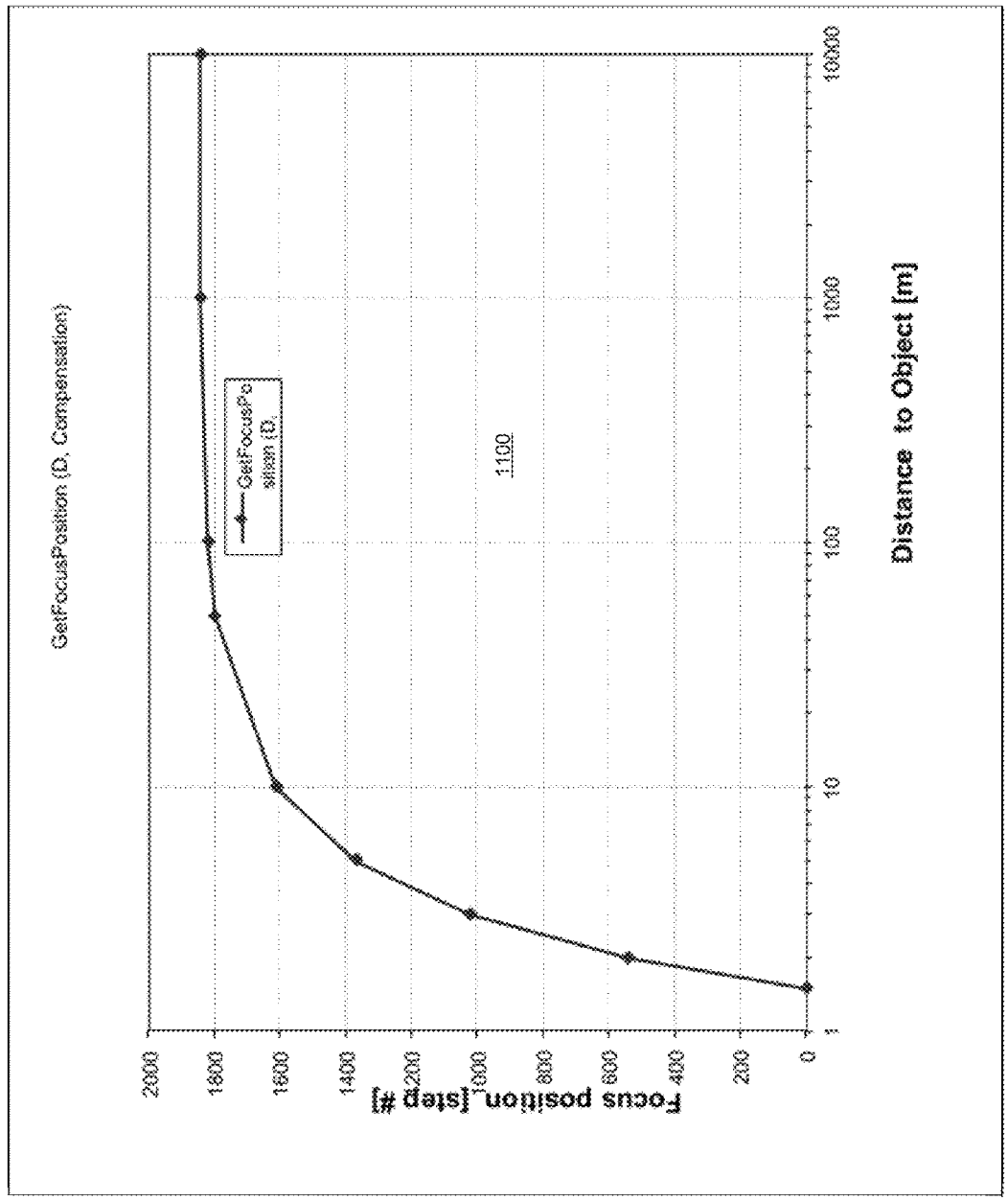
Figure 13A:
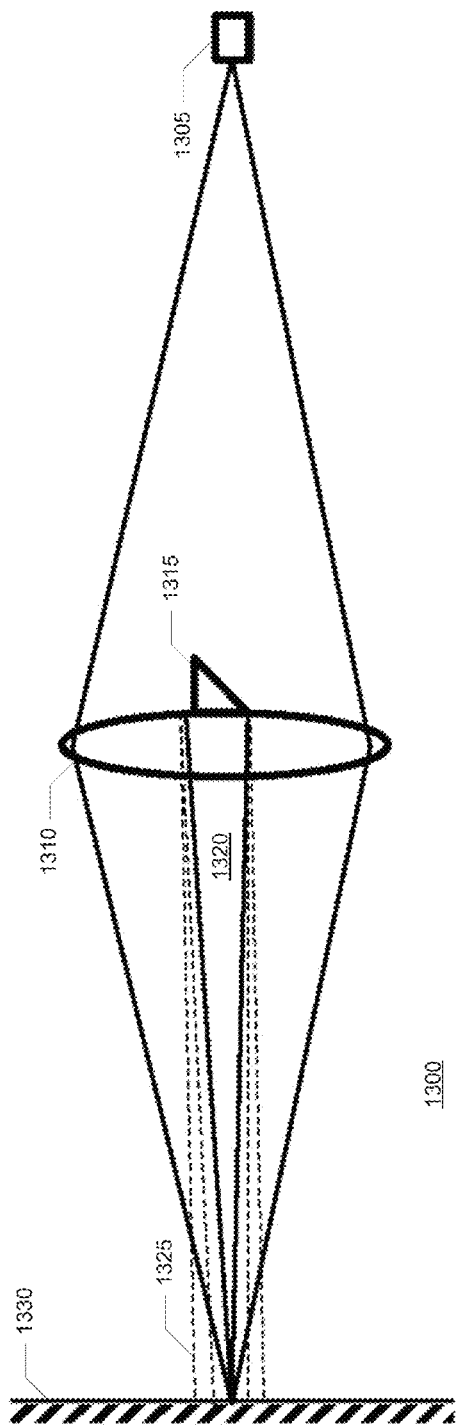
Figure 13B:
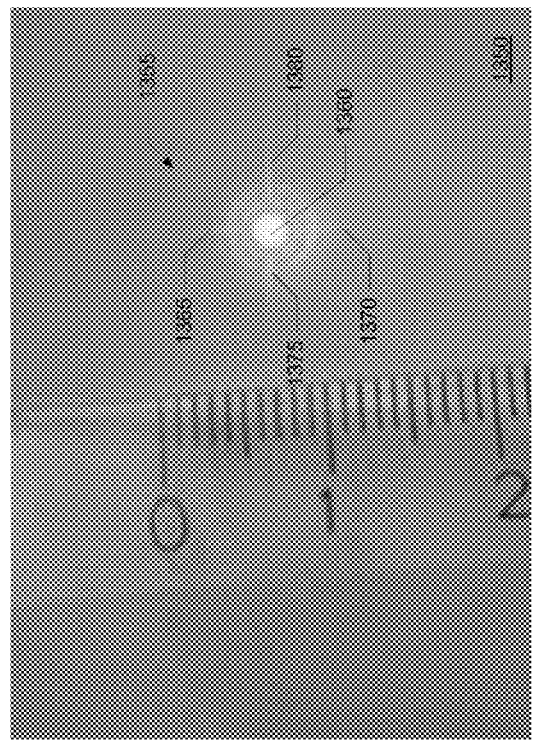
Figure 14A:
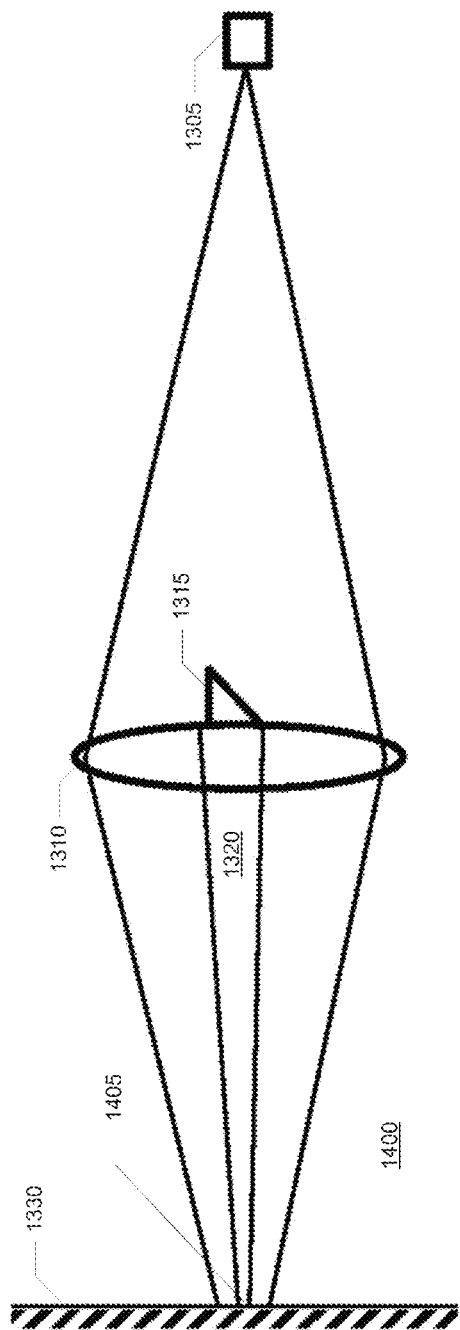
Figure 14B:
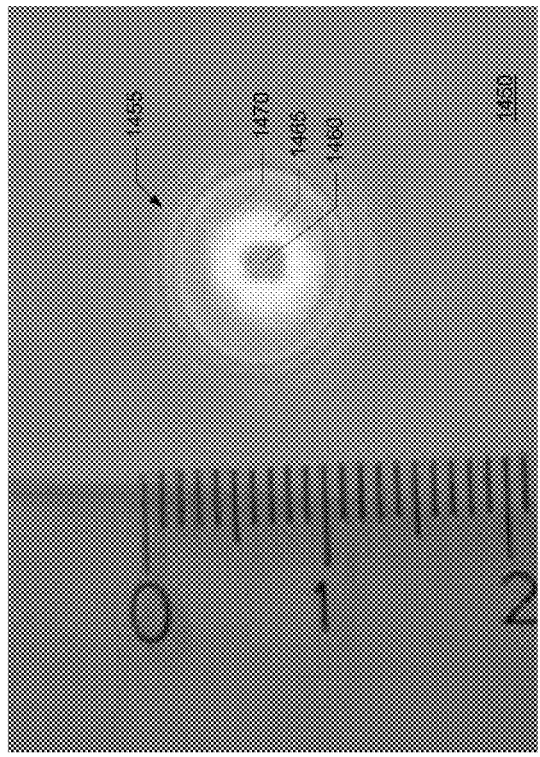
Figure 15:
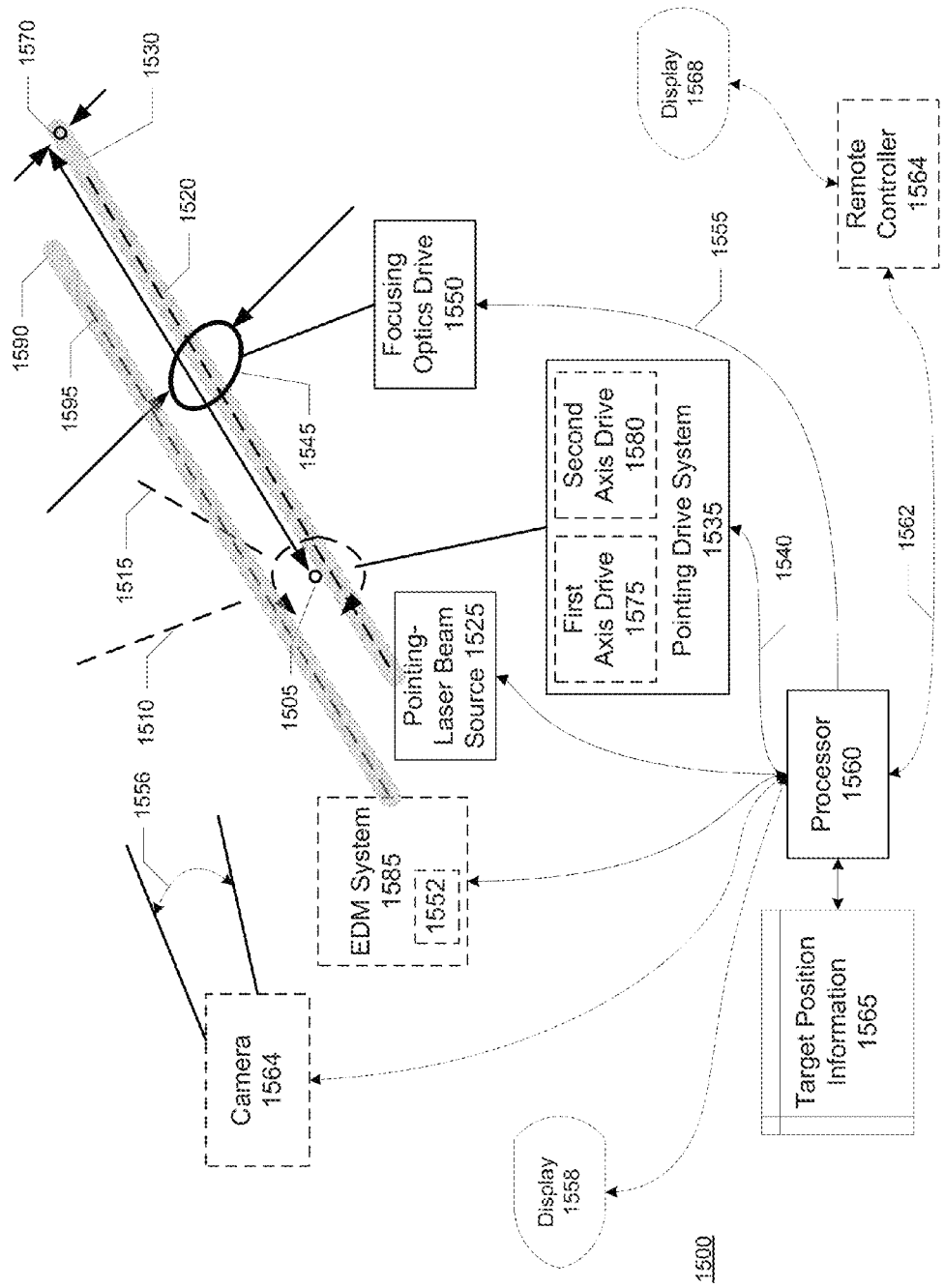
Figure 16:
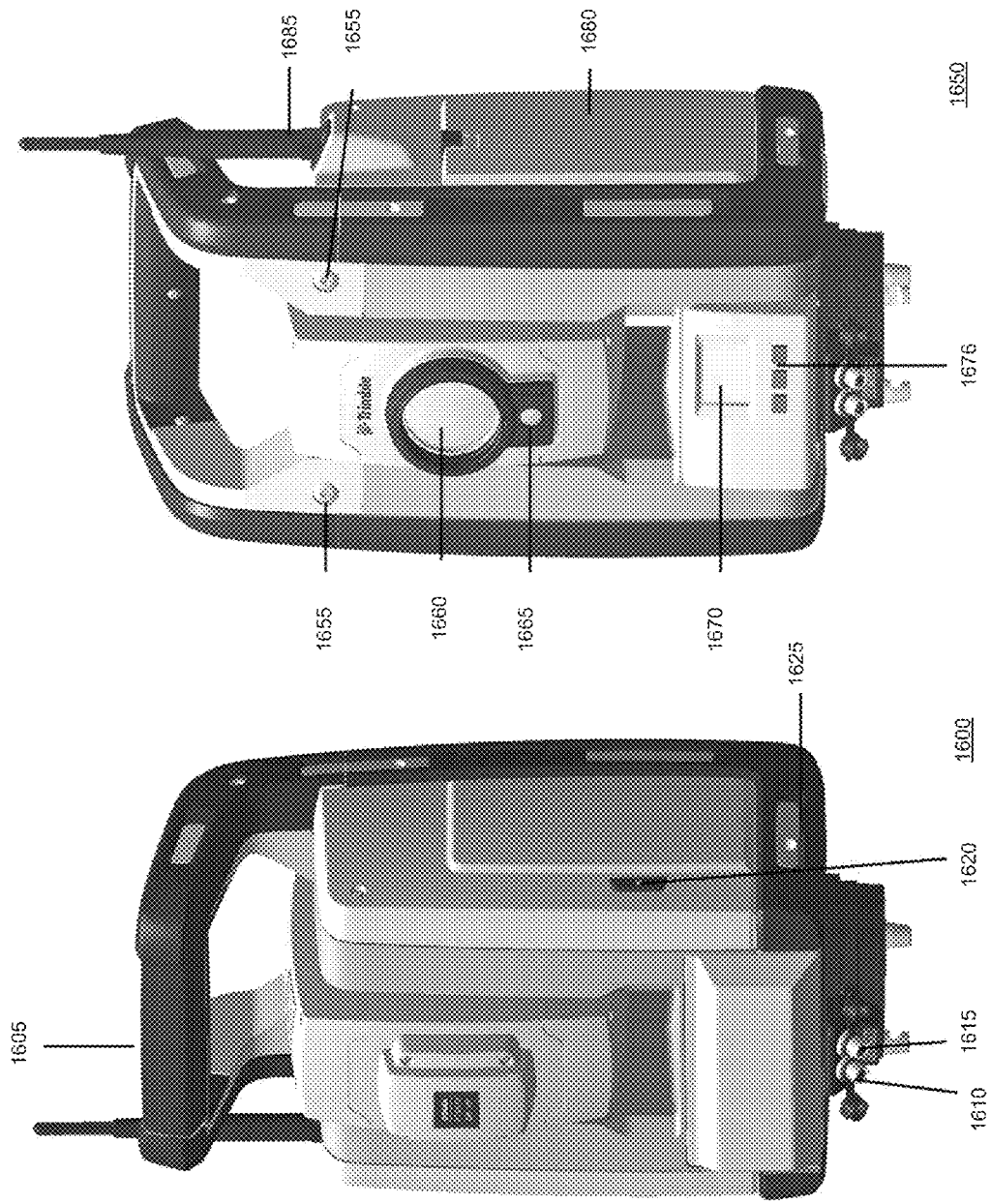
Figure 17:
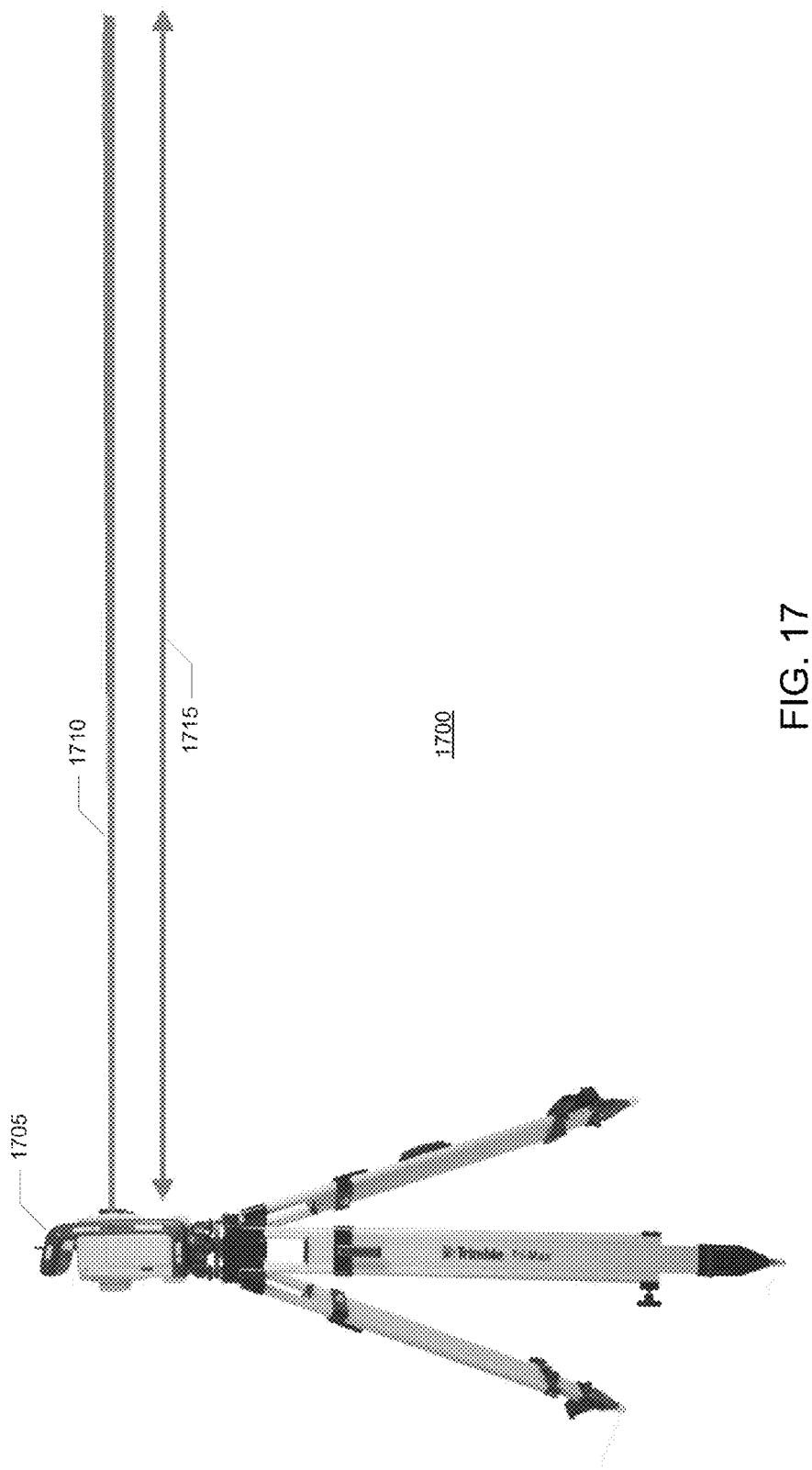
Figure 18:
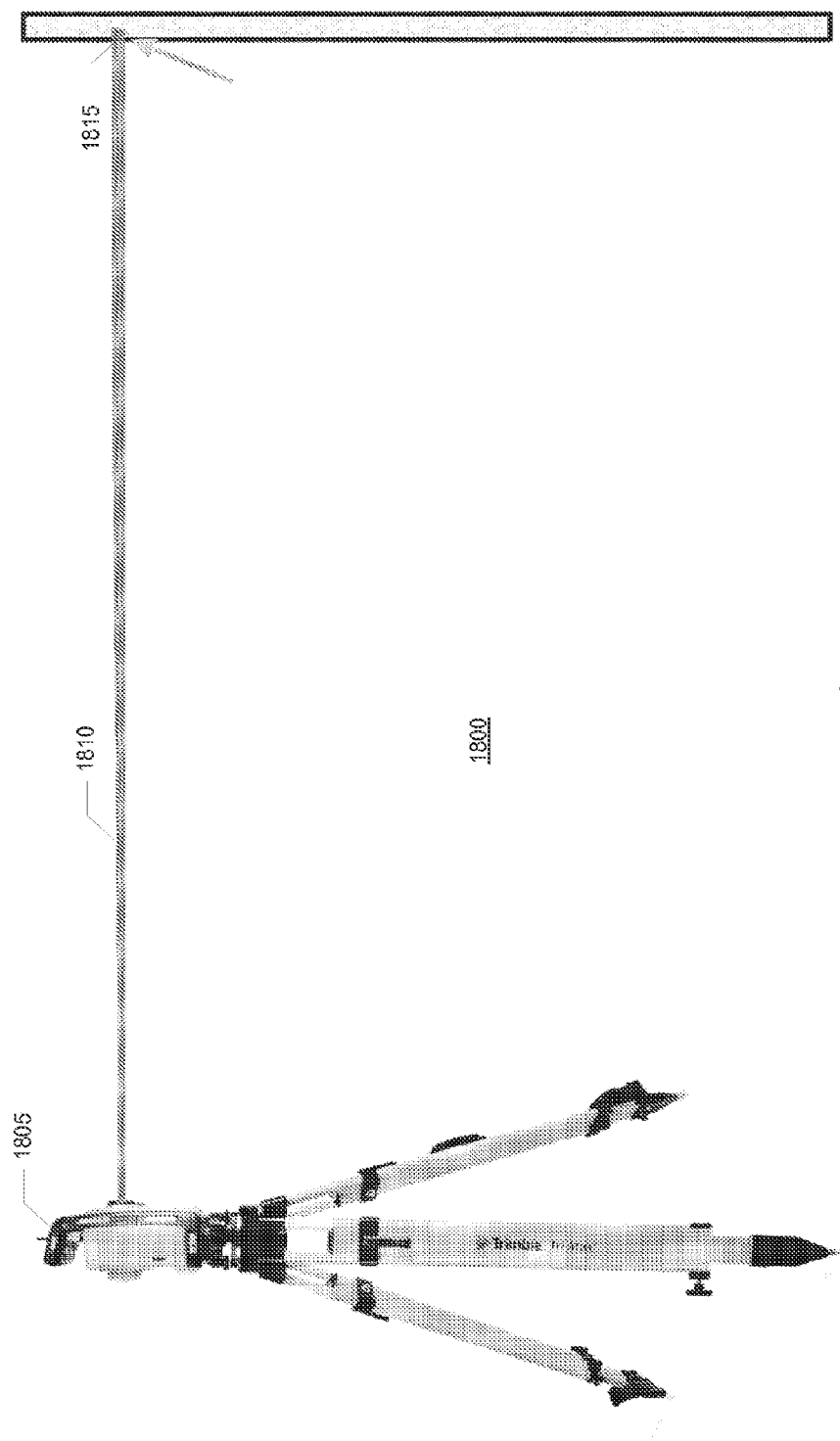
Figure 19:
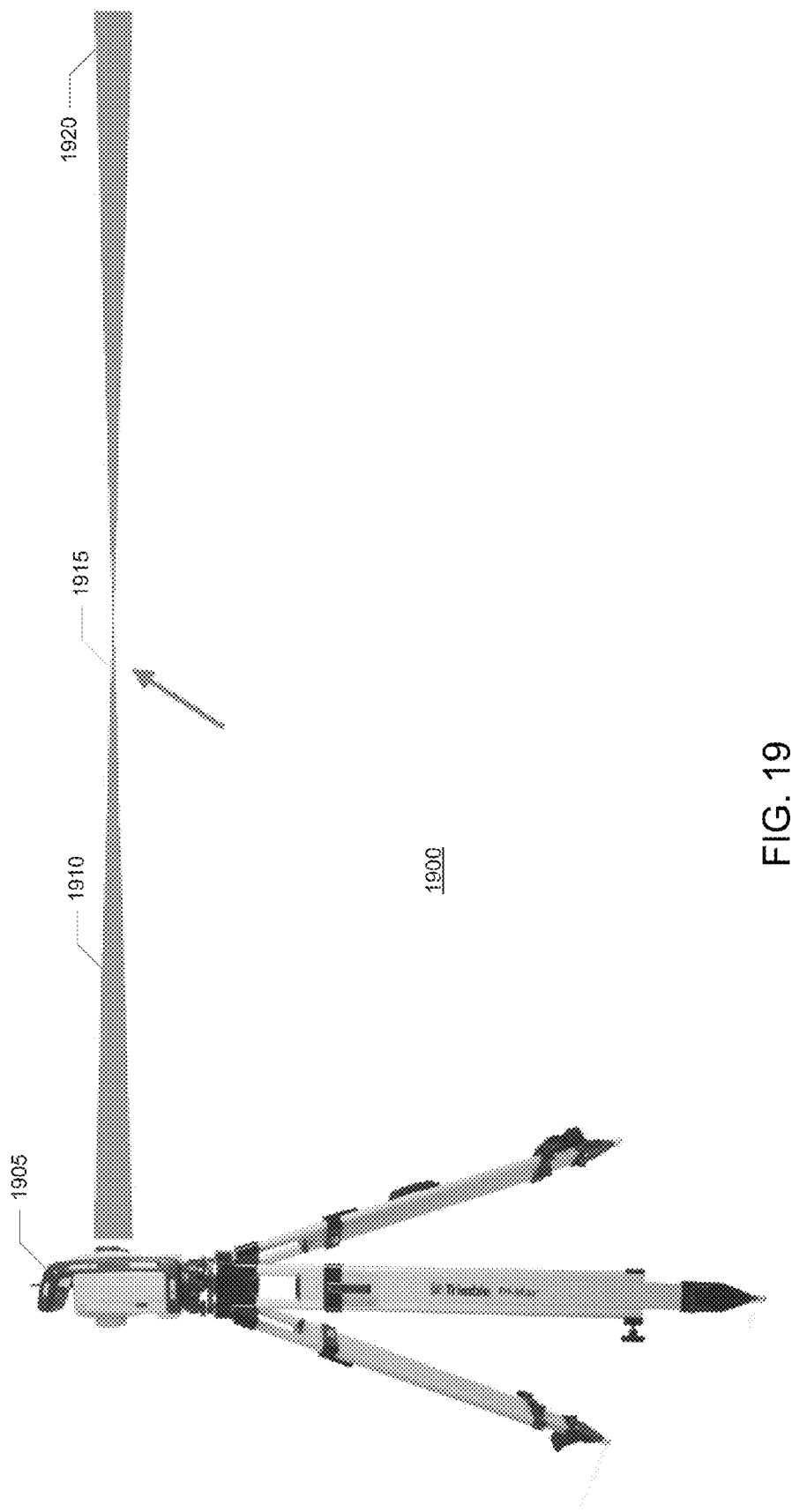
Figure 20:
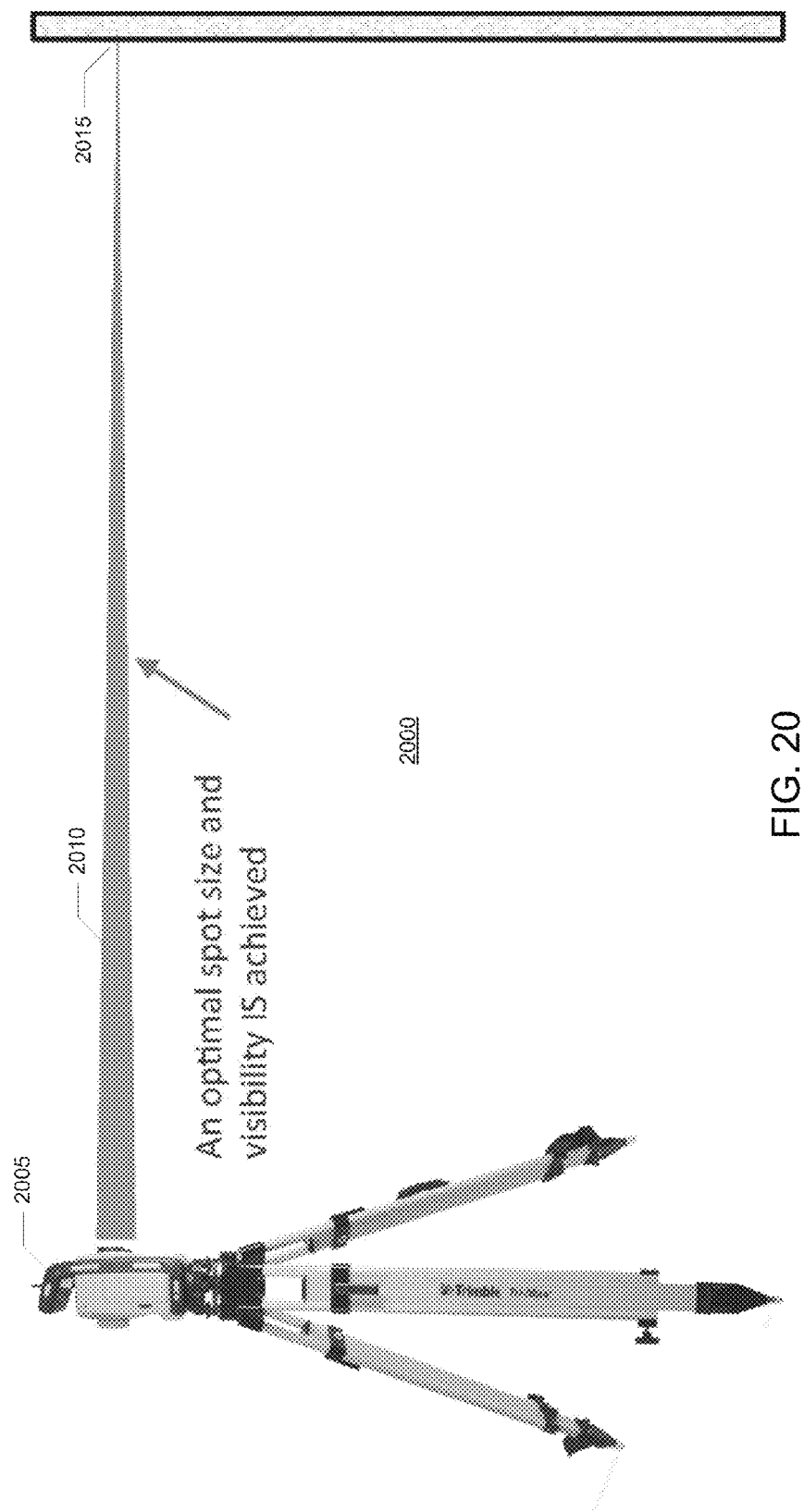

FIG. 6 schematically illustrates a front view of a robotic pointing apparatus in accordance with some embodiments of the invention;

FIG. 7 schematically illustrates a side view of the robotic pointing apparatus of FIG. 6;

FIG. 8 shows controllable focusing optics for a laser beam in accordance with some embodiments of the invention;

FIG. 9A and FIG. 9B show a controllable focusing scheme for a laser beam in accordance with some embodiments of the invention;

FIG. 10 schematically illustrates the optics of a robotic total station having a focusable laser pointer in accordance with some embodiments of the invention;

FIG. 11 shows a graph of focus position vs. distance to an object in accordance with some embodiments of the invention;

FIG. 12A schematically illustrates a plane wave passing through an aperture;

FIG. 12B illustrates diffraction of the surface of water due to a plane wave passing through an aperture;

FIG. 12C shows a graph of intensity distribution of a plane wave after passing through an aperture;

FIG. 12D shows in perspective view a simulation of intensity of a laser after passing through a square aperture;

FIG. 12E shows a focused spot projected on a surface by a laser beam after passing through a square aperture in accordance with some embodiments of the invention;

FIG. 13A schematically illustrates a laser beam passing through a lens having a prism at the center and focused in accordance with some embodiments of the invention;

FIG. 13B shows a focused spot of a laser beam projected on a surface after passing through a lens having a prism at the center in accordance with some embodiments of the invention;

FIG. 14A schematically illustrates a laser beam passing through a lens having a prism at the center and defocused in accordance with some embodiments of the invention;

FIG. 14B shows a defocused spot of a laser beam projected on a surface after passing through a lens having a prism at the center in accordance with some embodiments of the invention;

FIG. 15 is a schematic block diagram of an apparatus in accordance with some embodiments of the invention;

FIG. 16A is a perspective rear view of a robotic total station in accordance with some embodiments of the invention;

FIG. 16B is a perspective front view of a robotic total station in accordance with some embodiments of the invention;

FIG. 17 illustrates electronic distance measurement with a robotic total station;

FIG. 18 illustrates layout with an unfocused laser pointer;

FIG. 19 illustrates layout with a focused laser pointer in accordance with some embodiments of the invention;

FIG. 20 illustrates layout with a focused laser pointer in accordance with some embodiments of the invention;

FIG. 21 illustrates a method of operating an apparatus to set out a point in accordance with some embodiments of the invention; and FIG. 22 illustrates a method of operating an apparatus to measure a point in accordance with some embodiments of the invention.

DETAILED DESCRIPTION

FIG. 6 schematically illustrates at 600 front view of a robotic pointing apparatus 605 in accordance with some embodiments of the invention. A pointing device 610 having optics 615 is mounted on an alidade 620 for rotation about an axis 625 under control of a motorized drive 630. Alidade 620 is mounted on a base 635 for rotation about an axis 640 under control of a motorized drive 645. Base part is supported on a tribrach 650.

FIG. 7 schematically illustrates at 700 a side view of the robotic pointing apparatus 605 of FIG. 6. Pointing device 610 has a pointing axis 705. Each of the pointing axis 705, the rotation axis 625 and the rotation axis 640 may intersect one another, or not, and may intersect an instrument center 710, or not. The rotation axis 625 and the rotation axis 640 may be mutually orthogonal, or not. While it is convenient to have the pointing axis 705, the rotation axis 625 and the rotation axis 640 intersect one another at the instrument center 710, in practice this is difficult to achieve with high precision. Similarly, while it is convenient to have the rotation axis 625 and the rotation axis 640 substantially orthogonal to one another, this is also difficult to achieve with high precision. Schemes for compensation of these factors are known in the art.

As shown in FIG. 7, pointing device 610 has a laser source 715 emitting a laser beam along pointing axis 705. Focusing optics 720 in the laser beam path are adjusted by a focus controller 725 so that the laser spot size can be controlled as a function of range.

FIG. 8 shows at 800 the controllable focusing optics for a laser beam in accordance with some embodiments of the invention. In this example, focus controller 725 includes a motorized drive 725 for moving the focusing lens 720 over a range 730 to adjust the laser spot size according to range of the target on which the laser spot is to be projected.

FIG. 9A and FIG. 9B show at 900 and 950, respectively, a controllable focusing scheme for a laser beam in accordance with some embodiments of the invention. In this example, focus controller 725 includes a motorized drive 905 which focuses the laser beam by moving laser source 715 relative to lens 615. FIG. 9A shows the laser beam focused for a target at a longer range, while FIG. 9B shows the laser beam focused for a target at a shorter range.

FIG. 10 schematically illustrates at 1000 the optics of a robotic total station having a focusable laser pointer in accordance with some embodiments of the invention. A laser pointer optical path along optical axis 1045 is defined by a pointing-laser source 1015, a focusing lens 1020, and a front lens 1005. Focusing lens 1020 is adjusted by a motorized focusing drive 1025. An EDM laser beam 1040 from a measurement-laser source (not shown) enters from the side and is deflected by a transmitter prism 1040 to exit as a small-diameter beam through front lens 1005 along optical axis 1045. Light received along optical axis 1045 enters over the full aperture of front lens 1005 (the extent of which is indicated by ray paths 1050 and 1055) except that it is shadowed at the center by the small-diameter transmitter prism 1040. Received light is reflected by mirror 1060 along a path 1065 to an EDM detector (not shown). Optional mirror 1070 reflects light along a path 1075 to an optional target-tracking detector (not shown). FIG. 11 shows at 1100 a graph of focus position vs. distance to an object in accordance with some embodiments of the invention. The focus position for each distance to an object is given as a number of steps, e.g., of motorized focusing drive 1025. In some embodiments, these values are stored in a lookup table so that, when the distance to a target and the desired spot size on the target are known, the corresponding value is retrieved from the lookup table and used to control the motorized focusing drive 1025.

Alternatively, focus position is calculated as needed when the distance to a target and the desired spot size on the target are known. The focus position as function of the distance is derived from formulas used for the optics calculation. Because of production tolerances of the optics and mechanics the focus position function further has at least one calibration constant. That constant can be derived for example when the pointing laser spot is minimized in the manufacturing or by the user at a known distance. A mechanical alignment of the focusing optics at a known distance could compensate for the tolerances.

Visually identifying the center of a laser-pointer spot on a target can be difficult to do precisely. Accordingly, some embodiments of the invention project a laser-pointer spot of a shape which facilitates visual identification of the center of the spot. In some embodiments the spot has intensity variations in the shape of crossed lines. In some embodiments the spot has concentric rings around a central region of reduced brightness. In some embodiments the spot is modified by the diffraction of a positive or negative aperture to generate a pattern.

Since light is a wave, we apply wave theory. FIG. 12A schematically illustrates at 1200 a plane wave 1205 passing through an aperture 1210 along an axis toward a plane 1220.

To show the diffraction principle, FIG. 12B illustrates at 1230 the diffraction of a water surface due to a plane wave passing through an aperture.

FIG. 12C shows at 1240 a graph of intensity distribution of a plane wave after passing through an aperture. The central region 1245 is of high intensity, surrounded by smaller intensity peaks 1250, 1255, etc.

FIG. 12D shows at 1260 in perspective view a simulation of intensity of a laser after passing through a square aperture. A central region 1265 of high intensity is surrounded by two mutually-orthogonal lines of lower peaks, e.g., peaks 1270 and 1275.

FIG. 12E shows at 1280 a focused-laser spot projected on a surface by a laser beam after passing through a square aperture in accordance with some embodiments of the invention. A central region 1285 of higher brightness is at the center of two crossed lines of lower-intensity peaks. Such a laser spot facilitates visual identification of the center of a construction point.

FIG. 13A schematically illustrates at 1300 a laser beam from a source 1305 passing through a lens 1310 having a square-shaped prism 1315 at its center, e.g., transmitter prism 1040 of FIG. 10 which creates a shadow zone 1320 at the center of the laser beam and acts as a diffraction pattern generator. When the laser spot is focused at the range of a target surface 1330, the square shape of the prism causes diffraction perpendicular to the straight edges of the prism as in FIG. 13B. The diffraction spreads a portion of the laser light in the vertical plane and in the horizontal plane. The effect can be seen as a "crosshair" around the spot.

FIG. 13B shows at 1350 a focused spot 1355 of a laser beam projected on a surface after passing through a lens having a square-shaped prism at the center in accordance with some embodiments of the invention, e.g., as in FIG. 13A. The scale is in millimeters. The spot has a central region 1360 of highest intensity, surrounded by rings of varying intensity with smaller intensity peaks along mutually-orthogonal, crossed lines. In the image of FIG. 13B, lines 1365 and 1370 intersect with lines 1375 and 1380 to provide for ready visual identification of the spot and of the spot center.

FIG. 14A schematically illustrates at 1400 a laser beam from source 1305 passing through lens 1310 having square-shaped prism 1315 at its center, e.g., transmitter prism 1040 of FIG. 10 which creates a shadow zone 1320 at the center of the laser beam and acts as a diffraction pattern generator. In this example, the laser beam is defocusd at the range of target surface 1330 to from a laser spot on the target as in FIG. 14B.

FIG. 14B shows at 1405 a defocused spot 1455 of a laser beam projected on a surface after passing through a lens having a square-shaped prism at the center in accordance with some embodiments of the invention, e.g., as in FIG. 14A. The scale is in millimeters. The spot has a central region 1460 of lowest intensity, surrounded by rings 1465, 1470, etc. of varying intensity. In the image of FIG. 14B, the bullseye-like pattern of the laser spot provide for ready visual identification of the spot center. Thus when the spot is defocused it appears as a "shadow-image" of the exit aperture, which means that the blocked part of the light is visible as a darker area in the center of the spot. Since the dark portion is much smaller than the spot itself and appears in the center of the spot, it can be used to mark a point more accurately than the spot size.

FIG. 15 shows at 1500 a schematic block diagram of an apparatus in accordance with some embodiments of the invention. The apparatus has an instrument center 1505, a first rotation axis 1510, a second rotation axis 1515, and a pointing axis 1520. The first rotation axis 1510, the second rotation axis 1515, and the pointing axis 1520 have a known relationship to an instrument center. A laser source 1525 provides a pointing-laser beam 1530 along the pointing axis 1520. A pointing drive system 1535 aims the laser beam by rotating the pointing axis 1520 about the instrument center 1505 in response to a pointing-direction control 1540. Focusing optics 1545 have a focusing-optics drive 1550 to focus the pointing-laser beam 1520 in response to a focusing-optics control 1555. A processor 1560, responsive to target-position information 1565, generates the pointing-direction control 1540 and focusing-optics control 1555.

Each of the first rotation axis 1510, the second rotation axis 1515, and the pointing axis 1520 may intersect with one or both of the others, or not. Any or all of the first rotation axis 1510, the second rotation axis 1515, and the pointing axis 1520 may intersect with the instrument center 1505, or not. In some embodiments, at least two of the first rotation axis 1510, the second rotation axis 1515, and the pointing axis 1520 may intersect at the instrument center.

In some embodiments, the target-position information 1565 represents a target location 1570 relative to the instrument center, and the pointing-direction control 1540 causes the pointing drive system 1535 to aim the pointing-laser beam 1530 at the target location 1570.

In some embodiments, the focusing-optics control 1555 causes the focusing optics 1545 to focus the pointing-laser beam 1520 with a predetermined beam diameter at the target location 1570.

In some embodiments, the processor 1560 is operative to compute the focusing-optics control 1555 based on range between the instrument center 1505 and the target location 1570.

In some embodiments, the pointing drive system 1535 comprises a first controllable drive 1575 for rotating the pointing axis 1520 to a selected rotation angle about the first rotation axis 1510, and a second controllable drive 1580 for rotating the pointing axis 1520 to a selected rotation angle about the second rotation axis 1515. In some embodiments, the pointing-direction control 1540 comprises signals representing the selected rotation angles.

In some embodiments, the focusing optics system comprises at least one optical element and the focusing-optics drive 1550 is operative to focus the pointing-laser beam 1530 by modifying at least one optical property of the focusing optics 1545. As illustrated in FIG. 9A and FIG. 9B, focusing can be done by moving the source with respect to the lens without changing the optical property of the optical element (e.g., lens). Alternatively, or in addition to moving the source, an optical property of the optical element is changed, e.g., the power of the lens (liquid lens) and/or distance between the lens and the source and/or the distance between two optical elements.

To minimize divergence of the pointing-laser beam, the focusing optics system comprises a collimation lens having an exit aperture as large as possible. In some embodiments, the exit aperture is at least 5 mm. In some embodiments, the exit aperture is at least 10 mm. In some embodiments, the exit aperture is at least 20 mm. In some embodiments, the exit aperture is at least 30 mm.

In some embodiments, the processor 1560 is further operative to compensate the pointing-direction control 1540 for any lack of mutual orthogonality of the first rotation axis 1510 and the second rotation axis 1515. In some embodiments, the processor 1560 is further operative to compensate the pointing-direction control 1540 for any lack of mutual orthogonality of the second rotation axis 1515 and the pointing axis 1520.

Some embodiments in accordance with the invention further include an optional electronic distance measurement system 1585 which is operative to emit a measurement beam 1590 along a measurement-beam path 1595, e.g., when commanded by processor 1560. In some embodiments, the measurement-beam path 1595 optionally intersects the instrument center 1505.

In some embodiments, the processor 1560 is optionally further operative to compensate the pointing-direction control 1535 for at least one of parallax and divergence of the pointing axis 1520 with respect to the measurement-beam path 1595.

In some embodiments, the electronic distance measurement system 1585 comprises a measurement-beam source 1552, and the pointing-laser source 1525 and the measurement-beam source 1552 are operated alternately.

In some embodiments, the pointing laser is green and the measurement beam is red. When the red laser is active, the instrument is measuring and is not yet ready for layout. When the green laser is active, the instrument is ready for layout. This offers a simple paradigm for the user: red means "wait" and green means "go."

In some embodiments, the processor controls the pointing-drive system to correct for misalignment between the measurement beam 1590 and the laser-pointer beam 1530 when switching between them. This is done by having two sets of alignment corrections (collimation errors), one for the laser pointer and one for the EDM, and switching between them when switching between laser pointer and EDM. This causes the pointing-drive system to re-aim so that the measurement beam 1590 and the laser-point beam 1530 will hit the same target location as the laser-pointer spot was before the switch, e.g., target location 1570, and vice versa.

In some embodiments, the electronic distance measurement system 1585 employs the pointing-laser source 1525 to generate the measurement beam 1590.

In some embodiments, the pointing-laser beam 1530 is a class 2 laser beam. In some embodiments, the pointing-laser beam 1530 has a wavelength within a range visible to the human eye. In some embodiments, the pointing-laser beam 1530 has a wavelength of between 500 nm and 610 nm (day luminosity >50%, green to orange color). In some embodiments, the pointing-laser beam 1530 has a wavelength of between 450 nm and 550 nm (night luminosity >50%, blue to green color). In some embodiments, the pointing-laser beam 1530 has a wavelength of between 520 nm and 590 nm (day luminosity >80%, green to yellow color).

In some embodiments, the processor 1560 is operative to control the laser source 1525 to set a power level of the pointing-laser beam 1530 between a zero level and a maximum level.

Some embodiments in accordance with the invention further include an optional camera 1554 operative to capture at least one of a still image and a live video image of a target region. In some embodiments, the camera has a field of view 1556 which encompasses a segment of the pointing axis 1520 for ranges of interest.

Some embodiments in accordance with the invention provide an optional touch-screen display 1558 which is operative to display an image of a target region captured by the optional camera 1554. In some embodiments, the user can tap on the touch-screen display to indicate a target location of interest and the processor is operative to control the pointing-drive system 1535 to aim the pointing axis 1520 at the indicated target location. In some embodiments, the camera is calibrated such that a pixel position in the camera image which corresponds to the laser-pointer spot is calibrated for different distances between 1 m and 100 m (to facilitate tap and move navigation using the camera image.)

In some embodiments, the user can then view the camera image of display 1558 to aid in finding the laser-pointer spot at the target location 1570. Many surfaces can look the same in a construction environment, making the laser-pointer spot difficult to find, such as 60 feet of wall surface. By viewing the camera image, the user can look for a feature which will aid in finding the laser-pointer spot, such as a stack of drywall or the user himself in the camera image.

In some embodiments, the camera 1554 has an automatic exposure control which indicates an exposure level, and the processor 1560 is operative to use the exposure-level indication to adjust the power of the pointing-laser beam source 1525. In some embodiments, the power is reduced for longer camera exposure times. In some embodiments, the power is increased for shorter camera exposure times.

Some embodiments in accordance with the invention further comprise an optional data link 1562 between processor 1560 and an optional controller 1564 remote from processor 1560. In some embodiments, the controller 1564 is operative to control the processor 1560 via the data link 1562. Some embodiments further include an optional touch-screen display 1568 in communication with remote controller 1564, and the processor 1560 is operative to control the system in response to commands entered on the display 1568, e.g., tap and move navigation as described above with reference to display 1558. In some embodiments, a camera image is captured with the laser-pointer spot visible in the camera image to document or prove the target location was correctly identified.

In accordance with some embodiments, the processor 1560 is operative to determine a collimation-error correction between the pointing axis 1520 and the measurement axis 1595. Techniques for error compensation are known, for example, from U.S. Pat. No. 7,441,340 B2.

In accordance with some embodiments, the target position information 1565 is retrieved from a physical storage medium. In some embodiments, the target position information 1565 is determined from a stored model having a known relationship to the instrument center 1505. In some embodiments, the target position information 1565 is previously obtained using the EDM system 1585, which has a known relationship to the instrument center 1505. In some embodiments, the target position information 1565 is previously obtained using an EDM of another apparatus having a measurement center in a known relationship to the instrument center 1505.

Trimble Navigation Limited plans to introduce new products embodying many of the inventive features described herein. These include the Trimble RTS873 robotic total station and the Trimble Field Tablet, which will provide layout solutions for MEP (Mechanical, Electrical and Plumbing) and Structures contractors with a version of the Trimble Field Link software and a Surface module. Incorporating an auto-focus green laser, the new Trimble RTS873 Robotic Total Station will allow building construction contractors the ability to more easily collect and layout field points using robotic interaction.

The new Trimble Field Tablet with multi-touch gesture control will provide a fluid, touch-based interface to 3D models and common layout routines within the Trimble Field Link software.

By interacting directly with the Trimble VISION® live video feed on the Trimble Field Tablet, contractors will be able to remotely view and measure field points within the Trimble Field Link software. This will allow contractors to move away from the total station, eliminating the need for manual sighting of points to be measured. The auto-focus green laser pointer provides enhanced visibility and more accurate positioning when using Visual Layout with Trimble Field Link for MEP to lay out overhead hangers or collecting as-built locations in bright daylight conditions.

The unique ability of the RTS873 robotic total station to focus the green laser at the defined measurement distance essentially eliminates the "laser spread" commonly seen with prior-art total station designs.

A complement to the new hardware, the Trimble Field Link software running on Trimble tablets will include the ability for contractors to view their design files in 3D (three dimension). This allows contractors to create, select, and lay out points from a 3D view. Another new feature in the software, Collect Floor Plan, offers the ability to automatically collect a virtual footprint of a room using the total station to measure walls or interior facades. Perfect for adaptive re-use and renovation projects, the collected floor plan data can be used in conceptual design applications such as SketchUp to easily create a 3D design model for use by architects, engineers and building contractors.

While the base features of Trimble Field Link software are the same for MEP, concrete, steel trades and general contractors, Trimble has developed a new module specifically for structures contractors. Ideal for concrete and general contractors, the new Surface module allows the user to define a surface boundary and points by grid spacing or total number of points to be collected. The surface can then be collected manually with a prism or automatically using Direct Reflex measurement. Once collected, the Trimble Field Link software can generate a report that will produce a color-coded topographical map of the surface showing enclosed high and low areas based on user defined reference elevation and tolerance. A report can be generated including the topographic representation as well as areas and volumes of enclosed high and low areas and percentage of surface defined as high, low, or in tolerance.

FIG. 16A is a perspective rear view 1600 and FIG. 16B is a perspective front view 1650 of the proposed RTS873 robotic total station embodying some of the inventive features described herein. The RTS 873 includes a removable handle 1605, a 12V power connector 1610, a communication connector 1615, an on/off and trigger key 1620, a bottom instrument height mark 1625, screws 1655 for removing handle 1605, coaxial optics 1660 for angle and distance measurements (tracker, red laser pointer and green laser pointers), camera optics 1665, face-2 display 1670, face-2 keyboard 1675, internal battery compartment 1680, and antenna 1685.

FIG. 17 illustrates at 1700 electronic distance measurement with a prior-art robotic total station 1705. The measurement beam 1710 of the EDM has a fixed focus distance 1715 providing good visibility over the functional operating range of the total station. The EDM laser has a small diameter (e.g., 5 mm) at the lens, increasing slightly with distance (e.g., 10 mm at 20 m). This is normal laser behavior.

FIG. 18 illustrates at 1800 a layout operation with an unfocused laser pointer 1810 of a prior-art total station 1805. The spot size 1815 at the target is not optimal and is not adequately visible to the human eye.

FIG. 19 illustrates at 1900 a layout operation with a robotic total station 1905 having a focused laser pointer 1910 in accordance with some embodiments of the invention. The laser pointer 1910 is focused at 1915 so as to produce a spot 1920 of optimal size on the target. The laser has a large diameter (e.g., 40 mm) at the lens and is preferably of a wavelength having high luminance (e.g., green). Auto-focusing allows bringing the laser into focus at any desired range, so that it can be focused to a small spot size, e.g., 2 mm diameter at 20 m. An optimal spot size and good visibility of the spot are achieved.

FIG. 20 illustrates at 2000 a layout operation with a robotic total station 2005 having a focused laser pointer 2010 in accordance with some embodiments of the invention. In this example, the laser pointer 2010 is focused at 2015 so as to produce a spot of optimal diameter on the target. The laser has a large diameter (e.g., 40 mm) at the lens and is preferably of a wavelength having high luminance (e.g., green). Auto-focusing allows to bring the laser into focus at any desired range, so that it can be focused to a small spot size, e.g., 4 mm diameter at 120 m. An optimal spot size and good visibility of the spot are achieved.

Figure 4:
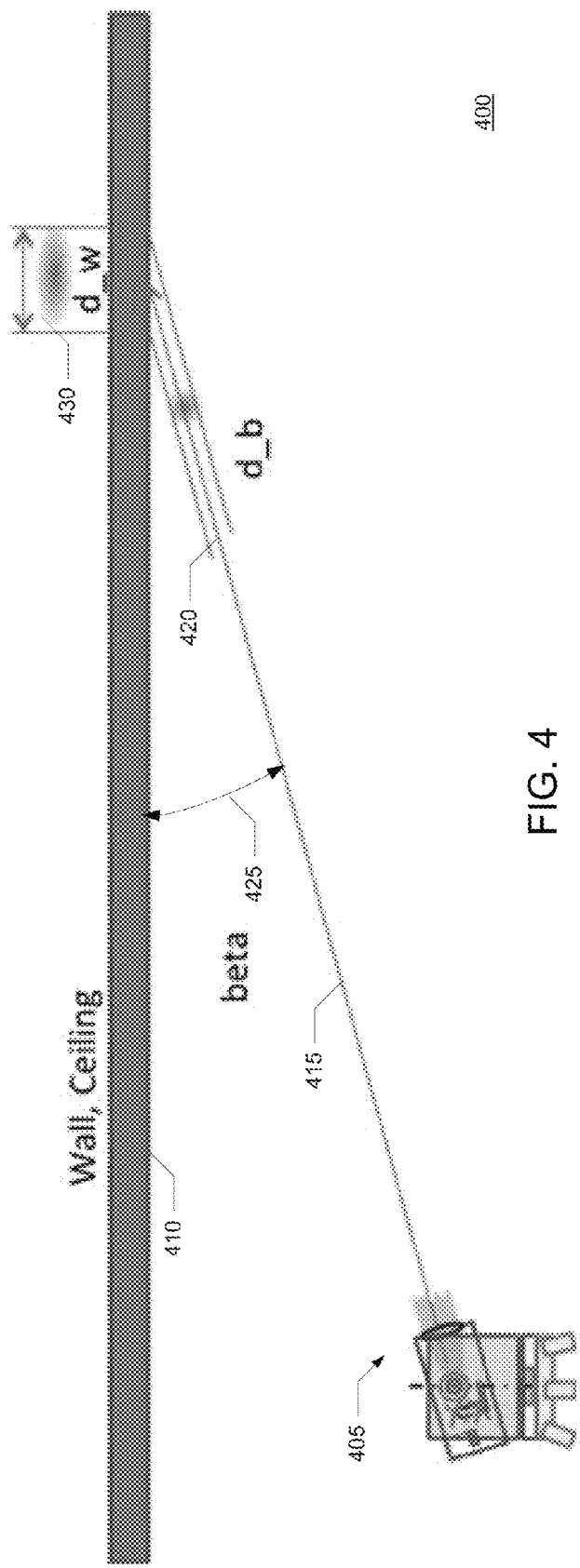

FIG. 4 schematically illustrates at 400 a layout scenario using a total station 405 with a focused laser pointer 415 to layout a point on a ceiling 410 in accordance with some embodiments of the invention. The angle beta between the ceiling 410 and the pointing-laser beam 415 is shown at 425. A pointing-laser beam of width d_b shown at 420 produces a spot of width d_w shown at 430 according to the relation $$d\_w = d\_b/\sin(\text{beta})$$

so that $d\_w \approx 3 \cdot d\_b$ for beta=20 deg and $d\_w \approx 6 \cdot d\_b$ for beta=9 deg.

Figure 1:
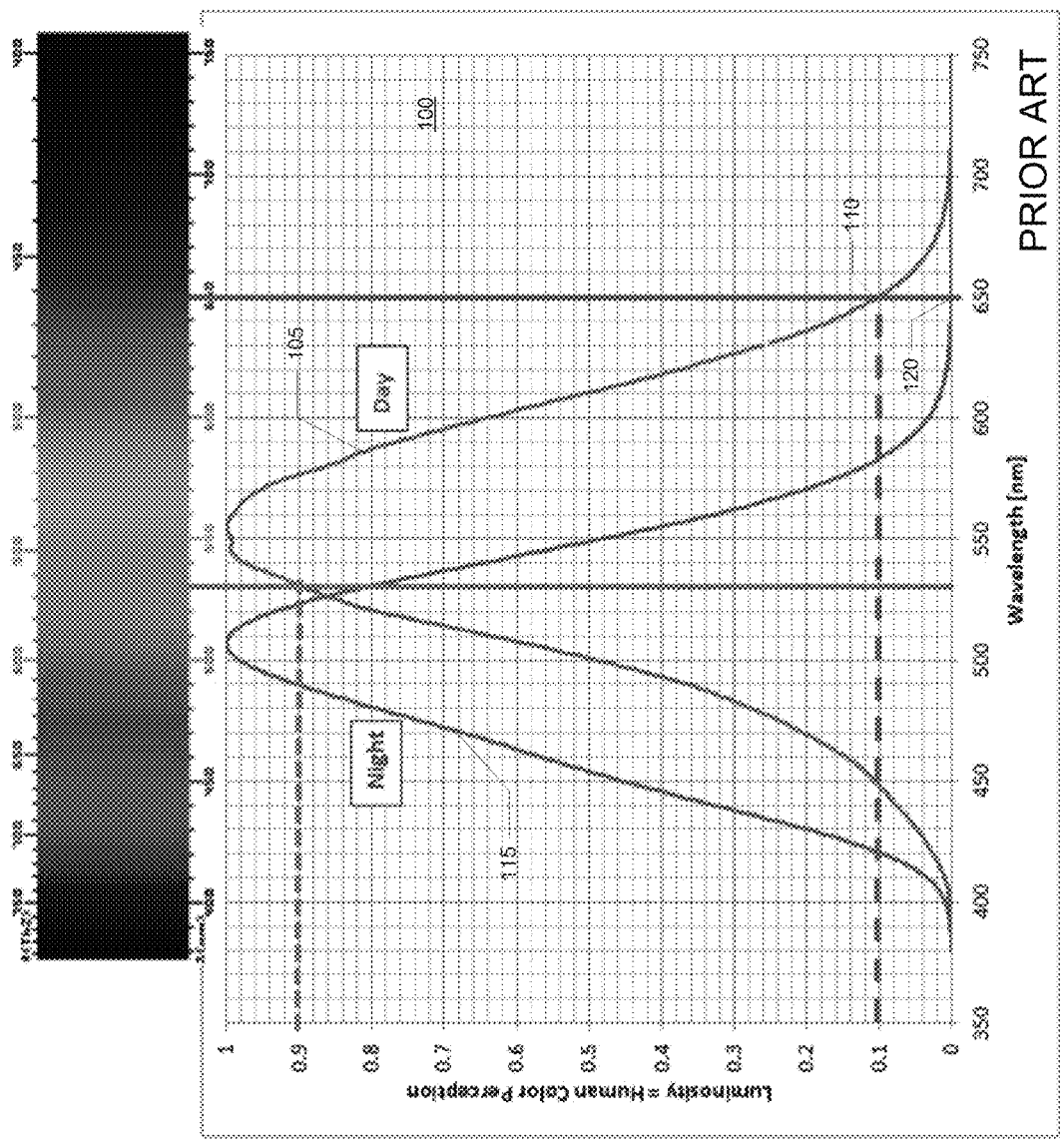
Figure 2:
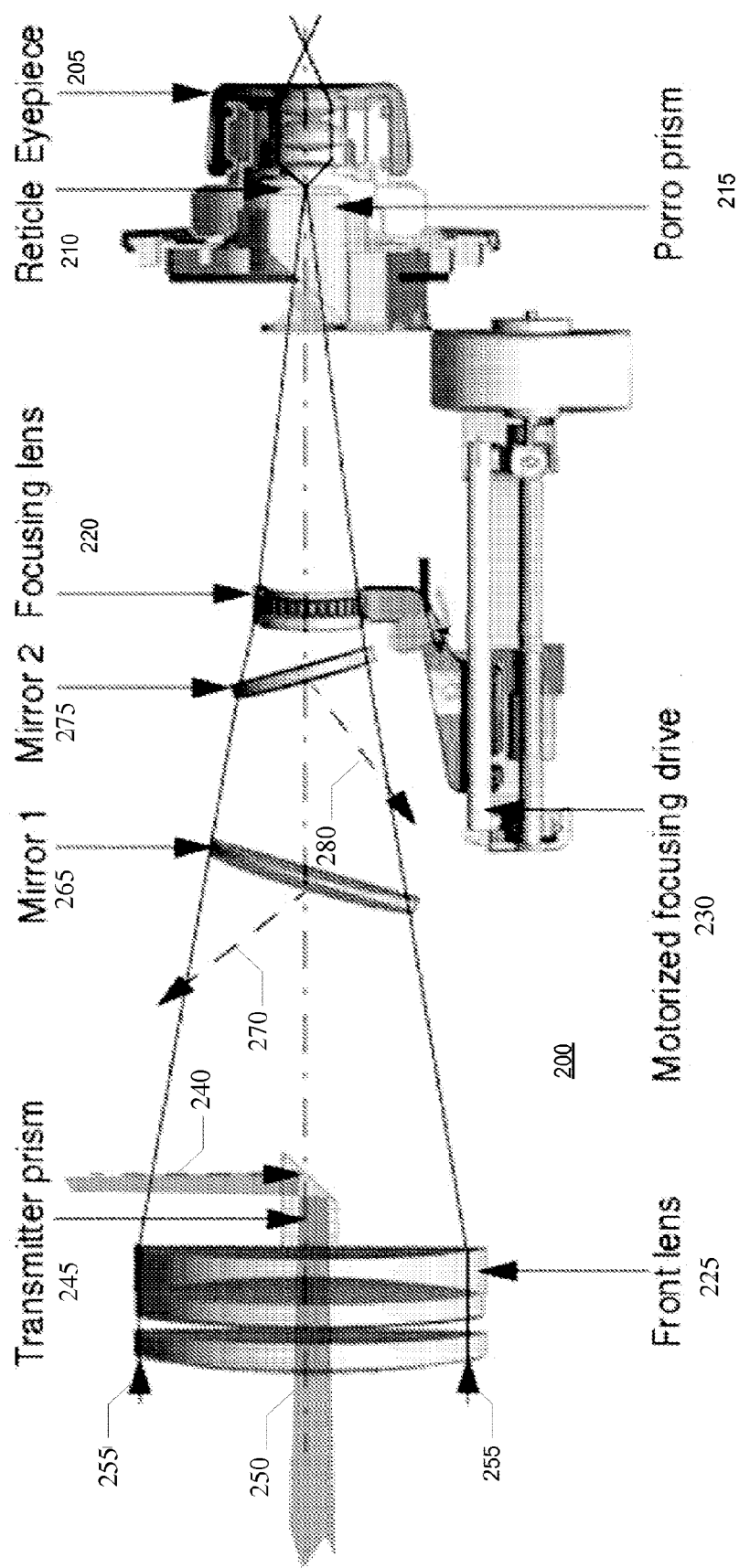
Figure 3:
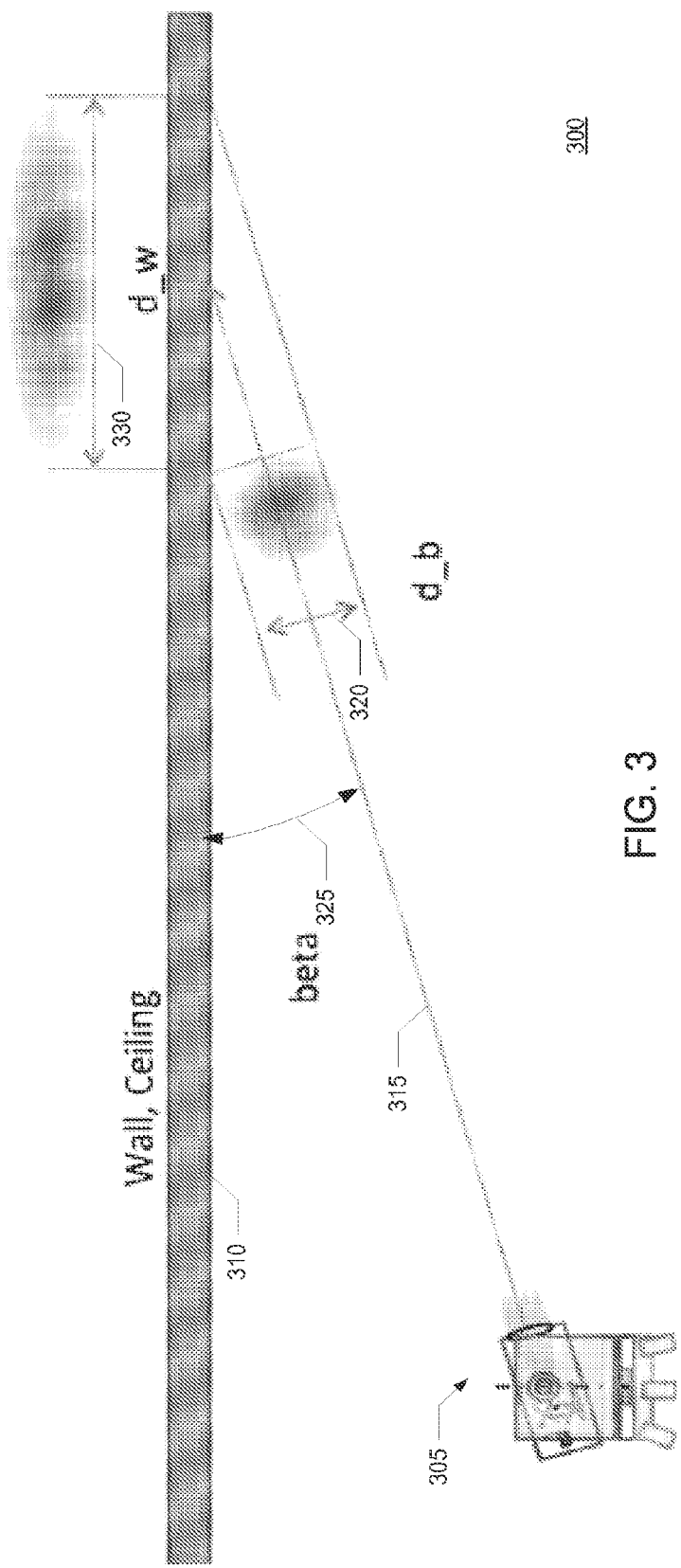

The advantage of the focused pointing-laser beam over the prior-art method using the unfocused EDM beam can be seen from comparison of FIG. 4 with the prior-art scenario of FIG. 3.

FIG. 21 illustrates at 2100 a method of operating an apparatus to set out a point in accordance with some embodiments of the invention. Data representing a target location is retrieved at 2105. The data can be from a model, from a previous measurement of this apparatus, or from a previous measurement of a different apparatus, for example. Range (distance) and direction (elevation & azimuth) from the instrument center to the target location are calculated at 2110. The pointing drive system (e.g., 1535 of FIG. 15) is operated at 2115 to aim the pointing axis (e.g., 1520 of FIG. 15) at the target location (e.g., 1570 of FIG. 15). The focusing optics drive (e.g., 1550 of FIG. 15) is operated at 2120 to focus the pointing-laser beam (e.g. 1570 of FIG. 15) to have a predetermined spot size at the target location. The pointing-laser source 1525 is activated at 2125 to generate the pointing-laser beam (e.g., 1530 of FIG. 15).

The steps of FIG. 21 can be ordered differently if desired. For example, step 2125 can be performed to generate the laser beam before one or more of the other steps. For example step 2120 can be performed to set the laser optics as soon as the range is determined. For example, step 2115 can be performed to aim the pointing axis as soon as the direction of the target location is determined. For example, step 2110 can be performed to calculate range and direction as soon as the target location data is available.

FIG. 22 illustrates at 2200 a method of operating an apparatus to measure a point in accordance with some embodiments of the invention.

The pointing drive system (e.g., 1535 of FIG. 15) is operated at 2205 to aim the pointing-laser beam in the general direction of a target location. This can be done, for example, either by direct user input to the processor or by tapping on the camera image displayed on a touch-screen display to provide approximate aiming information.

The approximate range (distance) between the target location and the instrument center is determined at 2210. This can be computed from a stored model or from a stored prior measurement of this apparatus or another apparatus, or can be obtained by measuring the range using the EDM of this apparatus (e.g., 1585 of FIG. 15). At 2215 the focusing optics (e.g., 1550 of FIG. 15) is operated to focus the pointing-laser beam (e.g., 1530 of FIG. 15) to have a predetermined spot size at the approximate range. The pointing-drive system (e.g., 1535 of FIG. 15) is operated at 2220 to aim the measurement beam at the target location. The EDM is operated at 2225 to measure a precise range from the instrument center to the target location, and to determine elevation and azimuth from pointing-drive system. Data is stored at 2230 representing the measurement of the target location.

Some embodiments provide for the pointing-laser beam to be available only when the apparatus is operated in a Direct Reflex (DR) mode of operation. Some embodiments provide for the EDM measurement laser to be on and the pointing laser to be off when the pointing axis is being moved. Some embodiments provide for the EDM measurement laser to be on and the pointing laser to be off when the EDM is making a distance measurement. Some embodiments provide for the EDM measurement laser to be off and the pointing laser to be on when the pointing axis is stationary. Some embodiments provide for the EDM measurement laser to be on and the pointing laser to be off when the EDM is unable to measure a distance (e.g., pointed at the sky). Some embodiments provide for the EDM measurement laser and the pointing laser never to be on simultaneously.

U.S. Pat. No. 8,031,332 describes a visual-layout procedure which can be implemented with an apparatus embodying features of the present invention. Some embodiments provide for the pointing-laser beam to be available during visual layout only when the apparatus is operated in a Direct Reflex (DR) mode of operation. Some embodiments provide for the EDM measurement laser to be on and the pointing laser to be off when the pointing axis is being moved to aim the pointing axis toward a target location during visual layout. Some embodiments provide for the EDM measurement laser to be off and the pointing laser to be on when the visual layout routine is complete and the pointing axis is stationary and aimed at a target location. Some embodiments provide for the EDM measurement laser and the pointing laser never to be on simultaneously during visual layout.

U.S. Pat. No. 7,441,340 B2 describes error compensation methods for surveying instruments. Such methods can be used with apparatus in accordance with some embodiments of the present invention to calibrate and compensate collimation error of the pointing axis of the pointing laser.

Some embodiments provide three ways of aiming: using a tracker, using a focusable laser pointer (e.g., green), and using the EDM measurement beam (e.g., red) as a laser pointer. To ensure measurement accuracy regardless of which of these is used for aiming, some embodiments use three separate sets of collimation error corrections, one for each aiming device, and switches between these so that the applied collimation error correction is appropriate for the aiming device in in use. The collimation error correction is used to adjust the pointing-direction control (e.g., 1540 in FIG. 15) so that the instrument aims at the same target location regardless of whether the tracker, the laser point, the measurement beam is used, even though these might otherwise result in a small discrepancy.

A traditional way to obtain the calibration-error corrections has been:
1. Calibrate the error compensator by obtaining a tilt reading in a first direction, turning the instrument 180 degrees and obtaining a tilt reading in a second direction, and calculating the average of the tilt readings in the two directions. Any deviation from zero is considered an error that has to be stored for use as a zero point correction.
2. Perform a two-face measurement to a static target and calculate the collimation error from the difference of the angles in face one and face two.
3. Repeat step 2 for each aiming device separately.

Some embodiments in accordance with the present invention employ a simplified workflow to calibrate the aim of the two laser pointers (e.g., a fixed-focus red EDM laser used as a pointer and a focusable green pointing laser) and the compensator. This simplified workflow gives slightly lower accuracy but reduces the time required:
1. Aim the red laser pointer to a static target (mark on a wall, etc) which gives face one, and register the horizontal angle (HA), the vertical angle (VA), the tilt reading (TiltX, Tilt Y).
2. Switch to face two, aim the green laser pointer to the same target, and register HA, VA, TiltX and TiltY.
3. Switch back to face one, aim the green laser pointer to the target, and register HA and VA.
4. Calculate the compensator zero point from the average of the tilt readings in face one and face two.
5. Calculate the collimation error of the green laser pointer from the difference between the angle readings in face one and face two. The vertical collimation error of the green laser pointer will be affected by any errors in the calibration of the compensator and is corrected with compensator zero point resulting from the calculation in point 4.
6. Calculate the collimation error of the red laser pointer as the collimation error of the green laser pointer added with the angular difference between the red and green laser pointer in face one.

The collimation error of the green laser pointer can be dependent on the distance to the target. This can be caused by production tolerances and misalignments of the optics or a nonlinear movement of the focusing lens. In some embodiments, these errors are handled by measuring the collimation error on a set of different distances and storing the results as a compensation table. This compensation table is consulted to obtain the appropriate collimation-error correction whenever the instrument has measured or otherwise determined a distance to the target, and the pointing-direction control is adjusted accordingly. In some embodiment, the same type of compensation for distance-dependent collimation error is used for the tracker.

Those of ordinary skill in the art will realize that the detailed description of embodiments of the present invention is illustrative only and is not intended to be in any way limiting.

In the interest of clarity, not all of the routine features of the implementations described herein are shown and described. It will be appreciated that in the development of any such actual implementation, numerous implementation-specific decisions must be made to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with embodiments of the present invention, the components, process steps and/or data structures may be implemented using various types of operating systems (OS), computer platforms, firmware, computer programs, computer languages and/or general-purpose machines. The methods can be run as a programmed process running on processing circuitry. The processing circuitry can take the form of numerous combinations of processors and operating systems, or a stand-alone device. The processes can be implemented as instructions executed by such hardware, by hardware alone, or by any combination thereof. The software may be stored on a program storage device readable by a machine. Computational elements can be implemented using an object-oriented programming language such that each required element is instantiated as needed.

Those of skill in the art will recognize that devices of a less general-purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

Methods in accordance with some embodiments may be implemented on a data processing computer such as a personal computer, workstation computer, mainframe computer, or high-performance server running an OS such as a version of Microsoft® Windows® available from Microsoft Corporation of Redmond, Wash., or various versions of the Unix operating system such as Linux available from a number of vendors. The methods may also be implemented on a multiple-processor system, or in a computing environment including various peripherals such as input devices, output devices, displays, pointing devices, memories, storage devices, media interfaces for transferring data to and from the processor(s), and the like. Such a computer system or computing environment may be networked locally, or over the Internet.

Any of the above-described methods and their embodiments may be implemented by means of a computer program. The computer program may be loaded in an apparatus having a processor, such as a robotic total station. Therefore, the invention also relates to a computer program which can enable a processor to carry out any one of the described methods and their embodiments.

The invention also relates to a computer-readable medium or a computer-program product including the above-mentioned computer program. The computer-readable medium or computer-program product may for instance be a magnetic tape, an optical memory disk, a magnetic disk, a magneto-optical disk, a CD ROM, a DVD, a CD, a flash memory unit or the like, wherein the computer program is permanently or temporarily stored. The invention also relates to a computer-readable medium (or to a computer-program product) having computer-executable instructions for carrying out any one of the methods of the invention.

The invention also relates to a firmware update adapted to be installed on devices already in the field, i.e. a computer program which is delivered to the field as a computer program product.

The constituent parts of a unit may be distributed in different software or hardware components or devices for bringing about the intended function.

Furthermore, the units may be gathered together for performing their functions by means of a combined, single unit.

The following is a partial summary of inventive concepts described herein:

1. A robotic laser-pointing apparatus, comprising:
   a. an instrument center,
   b. a first rotation axis, a second rotation axis, and a pointing axis, having a known relationship to an instrument center,
   c. a laser source providing a pointing-laser beam along the pointing axis,
   d. a pointing drive system to aim the laser beam by rotating the pointing axis about the instrument center in response to a pointing-direction control,
   e. focusing optics having a focusing-optics drive to focus the pointing-laser beam in response to a focusing-optics control,
   f. a processor, responsive to target-position information, to generate the pointing-direction control and the focusing-optics control.
2. The apparatus of 1, wherein at least two of the first rotation axis, the second rotation axis, and the pointing axis intersect at the instrument center.
3. The apparatus of 1 or 2, wherein the target-position information represents a target location relative to the instrument center, and the pointing-direction control causes the pointing drive system to aim the pointing-laser beam at the target location.
4. The apparatus of 3, wherein the focusing-optics control causes the focusing optics to focus the pointing-laser beam with a predetermined beam diameter at the target location.
5. The apparatus of 4, wherein the processor is operative to compute the focusing-optics control based on range between the instrument center and the target location.
6. The apparatus of one of 1-5, wherein the pointing drive system comprises a first controllable drive for rotating the pointing axis to a selected rotation angle about the first rotation axis, and a second controllable drive for rotating the pointing axis to a selected rotation angle about the second rotation axis, and wherein the pointing-direction control comprises signals representing the selected rotation angles.
7. The apparatus of one of 1-6, wherein the focusing optics system comprises at least one optical element and wherein the focusing-optics drive is operative to focus the pointing-laser beam by modifying at least one optical property of the focusing optics.
8. The apparatus of one of 1-7, wherein the focusing optics system comprises a collimation lens having an exit aperture of at least 5 mm.
9. The apparatus of one of 1-7, wherein the focusing optics system comprises a collimation lens having an exit aperture of at least 10 mm.
10. The apparatus of one of 1-7, wherein the focusing optics system comprises a collimation lens having an exit aperture of at least 20 mm.
11. The apparatus of one of 1-7, wherein the focusing optics system comprises a collimation lens having an exit aperture of at least 30 mm.
12. The apparatus of one of 1-11, wherein the processor is further operative to compensate the pointing-direction control for any lack of mutual orthogonality of the first rotation axis and the second rotation axis.
13. The apparatus of one of 1-12, wherein the processor is further operative to compensate the pointing-direction control for any lack of mutual orthogonality of the second rotation axis and the pointing axis.
14. The apparatus of one of 1-13, further comprising an electronic distance measurement system which emits a measurement beam along a measurement-beam path, and the pointing drive system is operative to aim the measurement beam by rotating the measurement-beam path about the instrument center in response to the pointing-direction control.

15. The apparatus of 14, wherein the measurement-beam path intersects the instrument center.
16. The apparatus of one of 14-15, wherein the processor is further operative to compensate the pointing-direction control for at least one of parallax and divergence of the pointing axis with respect to the measurement-beam path.
17. The apparatus of one of 14-16, wherein the electronic distance measurement system comprises a measurement-beam source, and wherein the laser source and the measurement-beam source are operated alternately.
18. The apparatus of one of 14-16, wherein the processor is operative to correct for misalignment between the pointing axis and the measurement-beam path by applying a first correction to the pointing-direction control when the pointing-laser beam is being aimed and by applying a second correction to the pointing-direction control when the measurement beam is being aimed.
19. The apparatus of one of 14-16, wherein the electronic distance measurement system employs the laser source for electronic distance measurement.
20. The apparatus of one of 1-19, wherein the pointing-laser beam is a class 2 laser beam.
21. The apparatus of one of 1-20, wherein the pointing-laser beam has a wavelength within a range visible to the human eye.
22. The apparatus of one of 1-21, wherein the pointing laser beam has a wavelength of between 500 nm and 610 nm.
23. The apparatus of one of 1-21, wherein the pointing laser beam has a wavelength of between 450 nm and 550 nm.
24. The apparatus of one of 1-21, wherein the pointing laser beam has a wavelength of between 520 nm and 590 nm.
25. The apparatus of one of 1-24, wherein the processor is operative to control the laser source to set a power level of the pointing-laser beam between a zero level and a maximum level.
26. The apparatus of one of 1-25, further comprising a camera operative to capture at least one of a still image and a live video image of a target region.
27. The apparatus of 26, wherein the camera has a field of view which encompasses a segment of the pointing axis.
28. The apparatus of one of 26-27, further comprising a touch-screen display which is operative to display an image of a target region captured by the camera, and wherein the processor is operative to generate the pointing-direction control in response to a tap at a point on the touch-screen display corresponding to a target location such that the pointing drive system aims the pointing axis at the target location.
29. The apparatus of 28, wherein the camera is calibrated such that a pixel position in a camera image on the touch-screen display which corresponds to a spot of the laser beam is calibrated for different distances between 1 m and 100 m to facilitate tap and move navigation using the camera image.
30. The apparatus of one of 26-29, wherein the camera comprises an automatic exposure control which indicates an exposure level, and the processor is operative to use the indicated exposure level to adjust output power of the laser source.
31. The apparatus of one of 1-30, further comprising a remote controller and a data link enabling communication between the remote controller and the processor.
32. The apparatus of 31, wherein the remote controller comprises a touch-screen display, and the processor is operative to control operation of the apparatus in response to commands entered on the touch-screen display.
33. The apparatus of 32, wherein the remote controller is operative to control the laser source, the pointing drive system and the focusing optics via the data link.
34. The apparatus of 32, wherein the remote controller is operative to retrieve an image captured by the camera.
35. The apparatus of one of 1-34, wherein the processor is further operative to determine a collimation-error correction by performing a calibration procedure.
36. The apparatus of one of 1-35, wherein the processor is further operative to retrieve a collimation-error correction from a set of stored correction data.
37. The apparatus of one of 1-36, wherein the target position information is a stored representation of a target location.
38. The apparatus of one of 1-36, wherein the target position information is obtained from a stored model having a known relationship to the instrument center.
39. The apparatus of one of 1-36, wherein the target position information is a stored representation of a measured point having a known relationship to the instrument center.
40. The apparatus of one of 1-39, further comprising a diffraction element positioned along the pointing axis to diffract the pointing-laser beam such that a spot focused on a target has at least one of a crosshair shape and a darkened center region.
41. The apparatus of one of 1-40, further comprising a leveling device operative to bring the first rotation axis parallel to plumb (gravity vector).
42. The apparatus of one of 1-40, further comprising a tilt sensor operative to measure deviation of the first rotation axis of the robot to plumb and wherein the processor is operative to adjust the pointing-direction control to compensate for the measured deviation.
43. A method of operating an apparatus according to one of 1-42, comprising:
    i. retrieving data representing a target location,
    ii. calculating distance and direction from the instrument center to the target location,
    iii. operating the pointing drive system to aim the pointing axis at the target location,
    iv. operating the focusing optics to focus the pointing-laser beam to a target distance based on the target location, [Note: the "target distance" can be different than the target location so the spot size is optimized at the target location]
    v. operating the laser source to provide the pointing-laser beam focused at the target distance.
44. A method of operating an apparatus according to one of 14-42, comprising:
    i. operating the pointing drive system to aim the pointing-laser beam in the general direction of a target location,
    ii. determining a range between the target location and the instrument center,
    iii. operating the focusing optics to focus the pointing-laser beam to have a predetermined spot size at the range,
    iv. operating the pointing drive system to aim the measurement beam at the target location,
    v. operating the EDM to measure range from the instrument center to the target location,
    vi. storing data representing a measurement of the target location.

The invention claimed is:

1. A robotic laser-pointing apparatus, comprising:
   a. an instrument center,
   b. a first rotation axis, a second rotation axis, and a pointing axis, having a known relationship to the instrument center,
   c. a laser source providing a pointing-laser beam along the pointing axis toward a target,
   d. a pointing drive system to aim the pointing-laser beam by rotating the pointing axis about the instrument center in response to a pointing-direction control,
   e. focusing optics having a focusing-optics drive to focus the pointing-laser beam in response to a focusing-optics control,
   f. a measurement laser source providing a measurement beam along a measurement-beam path,
   g. a prism positioned along the pointing axis and configured to direct at least a portion of the measurement beam along the pointing axis and toward the target, and
   h. a processor, responsive to light from the measurement beam reflected from the target, to generate the focusing-optics control.

2. The apparatus of claim 1, wherein at least two of the first rotation axis, the second rotation axis, and the pointing axis intersect at the instrument center.

3. The apparatus of claim 1, wherein the processor is further responsive to target-position information, to generate the pointing-direction control, the target-position information representing a target location relative to the instrument center, and the pointing-direction control causing the pointing drive system to aim the pointing-laser beam at the target location.

4. The apparatus of claim 3, wherein the focusing-optics control causes the focusing optics to focus the pointing-laser beam with a predetermined beam diameter at the target location.

5. The apparatus of claim 4, wherein the processor is operative to compute the focusing-optics control based on range between the instrument center and the target location.

6. The apparatus of claim 3, wherein the target position information is a stored representation of a target location.

7. The apparatus of claim 3, wherein the target position information is obtained from a stored model having a known relationship to the instrument center.

8. The apparatus of claim 3, wherein the target position information is a stored representation of a measured point having a known relationship to the instrument center.

9. The apparatus of claim 1, wherein the pointing drive system comprises a first controllable drive for rotating the pointing axis to a selected rotation angle about the first rotation axis, and a second controllable drive for rotating the pointing axis to a selected rotation angle about the second rotation axis, and wherein the pointing-direction control comprises signals representing the selected rotation angles.

10. The apparatus of claim 1, wherein the focusing optics comprises at least one optical element and wherein the focusing-optics drive is operative to focus the pointing-laser beam by modifying at least one optical property of the focusing optics.

11. The apparatus of claim 1, wherein the focusing optics comprises a collimation lens having an exit aperture of at least 5 mm.

12. The apparatus of claim 1, wherein the focusing optics comprises a collimation lens having an exit aperture of at least 10 mm.

13. The apparatus of claim 1, wherein the focusing optics comprises a collimation lens having an exit aperture of at least 20 mm.

14. The apparatus of claim 1, wherein the focusing optics comprises a collimation lens having an exit aperture of at least 30 mm.

15. The apparatus of claim 1, wherein the processor is further operative to compensate the pointing-direction control for any lack of mutual orthogonality of the first rotation axis and the second rotation axis.

16. The apparatus of claim 1, wherein the processor is further operative to compensate the pointing-direction control for any lack of mutual orthogonality of the second rotation axis and the pointing axis.

17. The apparatus of claim 1, wherein the pointing drive system is operative to aim the measurement beam by rotating the measurement-beam path about the instrument center in response to the pointing-direction control.

18. The apparatus of claim 17, wherein the processor is further operative to compensate the pointing-direction control for at least one of parallax and divergence of the pointing axis with respect to the measurement-beam path.

19. The apparatus of claim 17, wherein the processor is operative to correct for misalignment between the pointing axis and the measurement-beam path by applying a first correction to the pointing-direction control when the pointing-laser beam is being aimed and by applying a second correction to the pointing-direction control when the measurement beam is being aimed.

20. A method of operating an apparatus according to claim 17, comprising:
   i. operating the pointing drive system to aim the pointing-laser beam in the general direction of a target location,
   ii. determining a first range between the target location and the instrument center,
   iii. operating the focusing optics to focus the pointing-laser beam to have a predetermined spot size at the range,
   iv. operating the pointing drive system to aim the pointing-laser beam at the target location,
   v. determining a second range between the target location and the instrument center,
   vi. storing data representing a measurement of the target location.

21. The apparatus of claim 1, wherein the measurement-beam path intersects the instrument center.

22. The apparatus of claim 1, wherein the laser source and the measurement-beam source are operated alternately.

23. The apparatus of claim 1, wherein an electronic distance measurement system employs the measurement laser source for electronic distance measurement.

24. The apparatus of claim 1, wherein the pointing-laser beam is a class 2 laser beam.

25. The apparatus of claim 1, wherein the pointing-laser beam has a wavelength within a range visible to the human eye.

26. The apparatus of claim 1, wherein the pointing laser beam has a wavelength of between 500 nm and 610 nm.

27. The apparatus of claim 1, wherein the pointing laser beam has a wavelength of between 450 nm and 550 nm.

28. The apparatus of claim 1, wherein the pointing laser beam has a wavelength of between 520 nm and 590 nm.

29. The apparatus of claim 1, wherein the processor is operative to control the laser source to set a power level of the pointing-laser beam between a zero level and a maximum level.

30. The apparatus of claim 1, further comprising a camera operative to capture at least one of a still image and a live video image of a target region.

31. The apparatus of claim 30, wherein the camera has a field of view which encompasses a segment of the pointing axis.

32. The apparatus of claim 30, further comprising a touch-screen display which is operative to display an image of a target region captured by the camera, and wherein the processor is operative to generate the pointing-direction control in response to a tap at a point on the touch-screen display corresponding to a target location such that the pointing drive system aims the pointing axis at the target location.

33. The apparatus of claim 32, wherein the camera is calibrated such that a pixel position in a camera image on the touch-screen display which corresponds to a spot of the laser beam is calibrated for different distances between 1 m and 100 m to facilitate tap and move navigation using the camera image.

34. The apparatus of claim 30, wherein the camera comprises an automatic exposure control which indicates an exposure level, and the processor is operative to use the indicated exposure level to adjust output power of the laser source.

35. The apparatus of claim 1, further comprising a remote controller and a data link enabling communication between the remote controller and the processor.

36. The apparatus of claim 35, wherein the remote controller comprises a touch-screen display, and the processor is operative to control operation of the apparatus in response to commands entered on the touch-screen display.

37. The apparatus of claim 36, wherein the remote controller is operative to control the laser source, the pointing drive system and the focusing optics via the data link.

38. The apparatus of claim 36, wherein the remote controller is operative to retrieve an image captured by a camera.

39. The apparatus of claim 1, wherein the processor is further operative to determine a collimation-error correction by performing a calibration procedure.

40. The apparatus of claim 1, wherein the processor is further operative to retrieve a collimation-error correction from a set of stored correction data.

41. The apparatus of claim 1, wherein the prism diffracts the pointing-laser beam such that a spot focused on a target has at least one of a crosshair shape and a darkened center region.

42. The apparatus of claim 1, further comprising a leveling device operative to bring the first rotation axis parallel to plumb.

43. The apparatus of claim 1, further comprising a tilt sensor operative to measure deviation of the first rotation axis of the robot to plumb and wherein the processor is operative to adjust the pointing-direction control to compensate for the measured deviation.

44. A method of operating an apparatus according to claim 1, comprising:
   i. retrieving data representing a target location,
   ii. calculating distance and direction from the instrument center to the target location,
   iii. operating the pointing drive system to aim the pointing axis at the target location,
   iv. operating the focusing optics to focus the pointing-laser beam to a target distance based on the target location,
   v. operating the laser source to provide the pointing-laser beam focused at the target distance.

* * * * *